(12) United States Patent
Higginbotham et al.

(10) Patent No.: US 10,267,560 B2
(45) Date of Patent: Apr. 23, 2019

(54) PROCESS FOR RECOVERING HYDROCARBONS FROM CRUDE CARBON DIOXIDE FLUID

(71) Applicant: AIR PRODUCTS AND CHEMICALS, INC., Allentown, PA (US)

(72) Inventors: Paul Higginbotham, Surrey (GB); Liu Yang, Yorba Linda, CA (US); John Eugene Palamara, Macungie, PA (US); Vincent White, Ashtead (GB)

(73) Assignee: Air Products and Chemicals, Inc., Allentown, PA (US)

( * ) Notice: Subject to any disclaimer, the term of this patent is extended or adjusted under 35 U.S.C. 154(b) by 229 days.

(21) Appl. No.: 14/143,781

(22) Filed: Dec. 30, 2013

(65) Prior Publication Data

US 2015/0184932 A1    Jul. 2, 2015

(51) Int. Cl.
  *F25J 3/00* (2006.01)
  *F25J 3/02* (2006.01)
  (Continued)

(52) U.S. Cl.
  CPC ............ *F25J 3/0242* (2013.01); *B01D 3/143* (2013.01); *C10G 7/00* (2013.01); *C10G 70/041* (2013.01);
  (Continued)

(58) Field of Classification Search
  CPC ........ F25J 3/0242; F25J 3/0247; F25J 3/0266; F25J 3/0209; F25J 2200/76;
  (Continued)

(56) References Cited

U.S. PATENT DOCUMENTS

| 2,690,989 | A | * | 10/1954 | Bottenberg | C07C 7/005 196/132 |
| 4,152,129 | A | * | 5/1979 | Trentham | C07C 7/005 62/623 |

(Continued)

FOREIGN PATENT DOCUMENTS

| CN | 101108977 A | 1/2008 |
| CN | 102333846 A | 1/2012 |

(Continued)

OTHER PUBLICATIONS

Brown, B. D. et al., "Use of Ryan Holmes Technology for CO2 and NGL Recovery" Paper presented at GPA Annual Convention in 1998.

*Primary Examiner* — Keith Raymond
(74) *Attorney, Agent, or Firm* — Amy Carr-Trexler

(57) ABSTRACT

The power required to recover $C_{3+}$ hydrocarbons from crude carbon dioxide comprising $C_{1+}$ hydrocarbons and hydrogen sulfide may be reduced by distilling the crude carbon dioxide to produce carbon dioxide-enriched overhead vapor and $C_{3+}$ hydrocarbon-enriched bottoms liquid such that the hydrogen sulfide is rejected with the overhead vapor. Power consumption reductions may be achieved by incorporating a heat pump cycle using carbon dioxide vapor as working fluid to provide at least a part of the refrigeration duty and using a side reboiler to reduce the bottom reboiler duty. Where the bottoms liquid is further processed to produce "lighter" and "heavier" hydrocarbon fractions, the process enables optimization of upgrading crude oil on the basis of API gravity, Reid Vapor pressure and/or viscosity.

40 Claims, 8 Drawing Sheets

(51) Int. Cl.
*F25J 3/08* (2006.01)
*E21B 43/16* (2006.01)
*E21B 43/40* (2006.01)
*C10G 70/04* (2006.01)
*C10G 7/00* (2006.01)
*B01D 3/14* (2006.01)
*C10G 5/06* (2006.01)

(52) U.S. Cl.
CPC ............ *E21B 43/164* (2013.01); *E21B 43/40* (2013.01); *F25J 3/0209* (2013.01); *F25J 3/0266* (2013.01); *F25J 3/08* (2013.01); *C10G 5/06* (2013.01); *F25J 2200/02* (2013.01); *F25J 2200/04* (2013.01); *F25J 2200/30* (2013.01); *F25J 2200/50* (2013.01); *F25J 2200/72* (2013.01); *F25J 2200/74* (2013.01); *F25J 2200/76* (2013.01); *F25J 2205/50* (2013.01); *F25J 2215/02* (2013.01); *F25J 2220/84* (2013.01); *F25J 2260/60* (2013.01); *F25J 2260/80* (2013.01); *F25J 2270/12* (2013.01); *F25J 2270/60* (2013.01); *F25J 2270/88* (2013.01); *Y02C 10/12* (2013.01); *Y02P 90/70* (2015.11)

(58) Field of Classification Search
CPC .. F25J 2200/02; F25J 2200/50; F25J 2200/72; F25J 2200/74; F25J 2215/65; F25J 2215/66; F25J 2220/84; F25J 2260/80; F25J 2270/08

USPC .......................................... 62/630, 928, 929
See application file for complete search history.

(56) References Cited

U.S. PATENT DOCUMENTS

| | | | | |
|---|---|---|---|---|
| 4,563,202 A | * | 1/1986 | Yao | F25J 3/0209 |
| | | | | 2/17 |
| RE32,600 E | * | 2/1988 | Ryan | B01D 3/146 |
| | | | | 62/635 |
| 4,753,666 A | | 6/1988 | Pastor et al. | |
| 5,345,772 A | * | 9/1994 | Hopewell | C07C 7/05 |
| | | | | 62/632 |
| 6,308,532 B1 | * | 10/2001 | Hopewell | C07C 7/04 |
| | | | | 62/620 |
| 8,505,332 B1 | * | 8/2013 | Prim | C10L 3/104 |
| | | | | 585/802 |
| 2009/0112029 A1 | * | 4/2009 | Schultz | C07C 2/66 |
| | | | | 585/314 |
| 2011/0197629 A1 | * | 8/2011 | Prim | C10L 3/104 |
| | | | | 62/618 |
| 2013/0283851 A1 | | 10/2013 | Higginbotham et al. | |

FOREIGN PATENT DOCUMENTS

| | | | | |
|---|---|---|---|---|
| WO | WO 8102291 A1 | * | 8/1981 | ............ C01B 3/506 |
| WO | 2010076282 A1 | | 7/2010 | |
| WO | 2013084972 A1 | | 6/2013 | |
| WO | 2013151836 A1 | | 10/2013 | |

\* cited by examiner

PROCESS FOR RECOVERING HYDROCARBONS FROM CRUDE CARBON DIOXIDE FLUID

BACKGROUND OF THE INVENTION

This invention relates to a process for recovering $C_{3+}$ hydrocarbon compounds from crude carbon dioxide fluid comprising $C_{1+}$ hydrocarbon compounds and at least one non-hydrocarbon "heavy" impurity. The invention has particular application in processing crude carbon dioxide gas for recycle in a carbon dioxide enhanced oil recovery (EOR) process for extracting crude oil.

In a carbon dioxide EOR process, carbon dioxide is injected into aging oil fields to extract more oil than is possible by conventional water-flooding. As the oil is extracted from the field, carbon dioxide that is dissolved in the oil is recovered, recompressed, and recycled to the oil field. The recycled carbon dioxide can contain a significant amount of natural gas liquids (NGLs). The value of the NGL in the recycled carbon dioxide can reach levels where it is economically viable to recover these hydrocarbons for sale.

Recovering hydrocarbons from crude carbon dioxide obtained from an EOR process and recycling the carbon dioxide to the EOR process is known generally. Examples of previous attempts to develop suitable processes include U.S. Pat. No. 4,753,666A (Pastor et al; 1988) which discloses distilling a hydrocarbon-rich carbon dioxide gas in a single column to produce an NGL ($C_{4+}$) stream and an overhead stream containing substantially all of the carbon dioxide, methane, ethane, propane and hydrogen sulfide. An external propane refrigeration system is used for the condenser and a bottom reboiler maintains the bottom temperature at about 360° F. (182° C.). This process can be inefficient and expensive due to the use of the external refrigeration system. In addition, the valuable propane component is also lost in the process and is reinjected with the carbon dioxide recycle stream. Further, there is a relatively high duty requirement on the bottom reboiler, which is provided by a hot oil system or steam.

Another example is disclosed in WO2010/076282A (Marsh; 2010). In this process, a Joule-Thomson valve and a low temperature separator are placed before a distillation column in order to cool, condense and separate the heavier components ($C_{5+}$) from the associated gas. The $C_5$-$C_6$ hydrocarbons are then selectively recovered from the bottom of the distillation column. Carbon dioxide containing $C_1$-$C_4$ hydrocarbons is recovered from the top of the separator and from the top of the distillation column and sent back to the injection wells. There is a reboiler placed at the bottom of the distillation column. A disadvantage of this process is that valuable propane and butane components are not recovered and are recycled with the carbon dioxide stream. In addition, the entire feedstock is compressed before it goes through the Joule-Thomson valve so this process has a high power consumption. There is also a relatively high duty requirement on the bottom reboiler.

U.S. Pat. No. 8,505,332A (Prim et al; 2013) and its continuation application, US2011/00197629A, describe a two-stage distillation process that separates a hydrocarbon-rich carbon dioxide stream recycled in the EOR process into a purified carbon dioxide gas, a heavy NGL ($C_{4+}$) stream and a light NGL ($C_3$-$C_4$) stream. The first distillation column separates $C_{3+}$ from the associated gas with 20-35% $C_3$ recovery rate. The bottom liquid is sent to an amine unit to remove the acid gas(es) remaining in the NGL. The purified NGL is then sent to the second column to separate $C_3$-$C_4$ from the heavier components. The process is, however, inefficient and expensive in view of the use of an external refrigeration system. In addition, an external solvent is used for acid gas removal. There is also a relatively high duty requirement on the bottom reboiler, provided by a hot oil system.

It is desirable to develop a process for recovering $C_{3+}$ hydrocarbons from a crude carbon dioxide recycle stream from an EOR process, that is simple, efficient, and capable of optimizing overall hydrocarbon production with reduced capital and operating costs.

BRIEF SUMMARY OF THE INVENTION

It is an objective of the present invention to provide a process for recovery of $C_{3+}$ hydrocarbon compounds from crude carbon dioxide fluid.

It is an objective of preferred embodiments of the present invention to provide a process for recovery of $C_{3+}$ hydrocarbon compounds from a carbon dioxide recycle stream in an EOR process.

It is also an objective of preferred embodiments of the present invention to simplify the recovery of $C_{3+}$ hydrocarbon compounds from a carbon dioxide recycle stream in an EOR process.

In addition, it is an objective of preferred embodiments of the present invention to improve the efficiency of processes for recovery of $C_{3+}$ hydrocarbon compounds from a carbon dioxide recycle stream in an EOR process.

It is a further objective of preferred embodiments of the present invention to enable optimization of overall hydrocarbon production in an EOR process, ideally with reduced capital and/or operating costs compared to prior art processes.

According to a first aspect of the present invention, there is provided a process for recovering $C_{3+}$ hydrocarbon compounds from crude carbon dioxide fluid comprising $C_{1+}$ hydrocarbon compounds and at least one non-hydrocarbon "heavy" impurity, said process comprising:

feeding crude carbon dioxide fluid to a distillation column system for distillation to produce carbon dioxide-enriched overhead vapor comprising $C_1$-$C_3$ hydrocarbon compounds and said non-hydrocarbon "heavy" impurity, and $C_{3+}$ hydrocarbon-enriched bottoms liquid;

re-boiling said distillation column system by at least partially vaporizing by indirect heat exchange at least a portion of said $C_{3+}$ hydrocarbon-enriched bottoms liquid and at least one intermediate liquid in or taken from said distillation column system to provide vapor for said distillation column system;

cooling and at least partially condensing carbon dioxide-enriched overhead vapor and/or a compressed carbon dioxide-enriched recycle gas produced therefrom, by indirect heat exchange to produce at least partially condensed carbon dioxide-enriched gas; and providing at least a portion of said at least partially condensed carbon dioxide-enriched gas as reflux for said distillation column system.

Preferred embodiments of the present invention involve an improvement in heat integration of a carbon dioxide processing scheme for carbon dioxide EOR processes to reduce, and preferably minimize, the energy requirement for separating carbon dioxide and NGLs by distillation.

In some embodiments, a crude carbon dioxide gas is separated from crude oil and comprises NGLs, methane and other impurities such as nitrogen and hydrogen sulfide. This crude gas is fed to a distillation column system and separated to form a carbon dioxide-enriched overhead gas and $C_{3+}$ hydrocarbon-enriched liquid. The carbon dioxide-enriched overhead gas comprises at least substantially all of the nitrogen, hydrogen sulfide, methane and ethane from the feed, together with a part of the propane. The carbon dioxide-enriched gas is recovered from the top of the distillation column system and part is typically further compressed for re-injection. The remaining part of the gas is used in a carbon dioxide heat pump to provide boilup and condensation for the distillation column system. The column system also has at least one side reboiler which is heated by condensing a portion of the recycle stream of the heat pump to reduce the heat duty requirement of the bottom reboiler.

Use of the carbon dioxide as a refrigerant fluid in a heat pump cycle may eliminate the need for external refrigeration. The heat of compression and/or energy from a separate fired heater can provide column reboiler duty.

The $C_{3+}$ hydrocarbon-enriched stream may be sold directly as NGL product. However, an optional aspect of this invention is that all or a portion of the NGL can be blended into the oil coming from the EOR process (or from other sources) to increase the overall amount of oil produced. If a portion of the NGL is to be blended with the oil, the splitting of the NGL may be controlled based on the API gravity, Reid Vapor Pressure and/or viscosity constraints on the blended oil. Different blending strategies are provided to improve and preferably maximize the economic value of the final products.

DETAILED DESCRIPTION OF THE INVENTION

Figure 1:
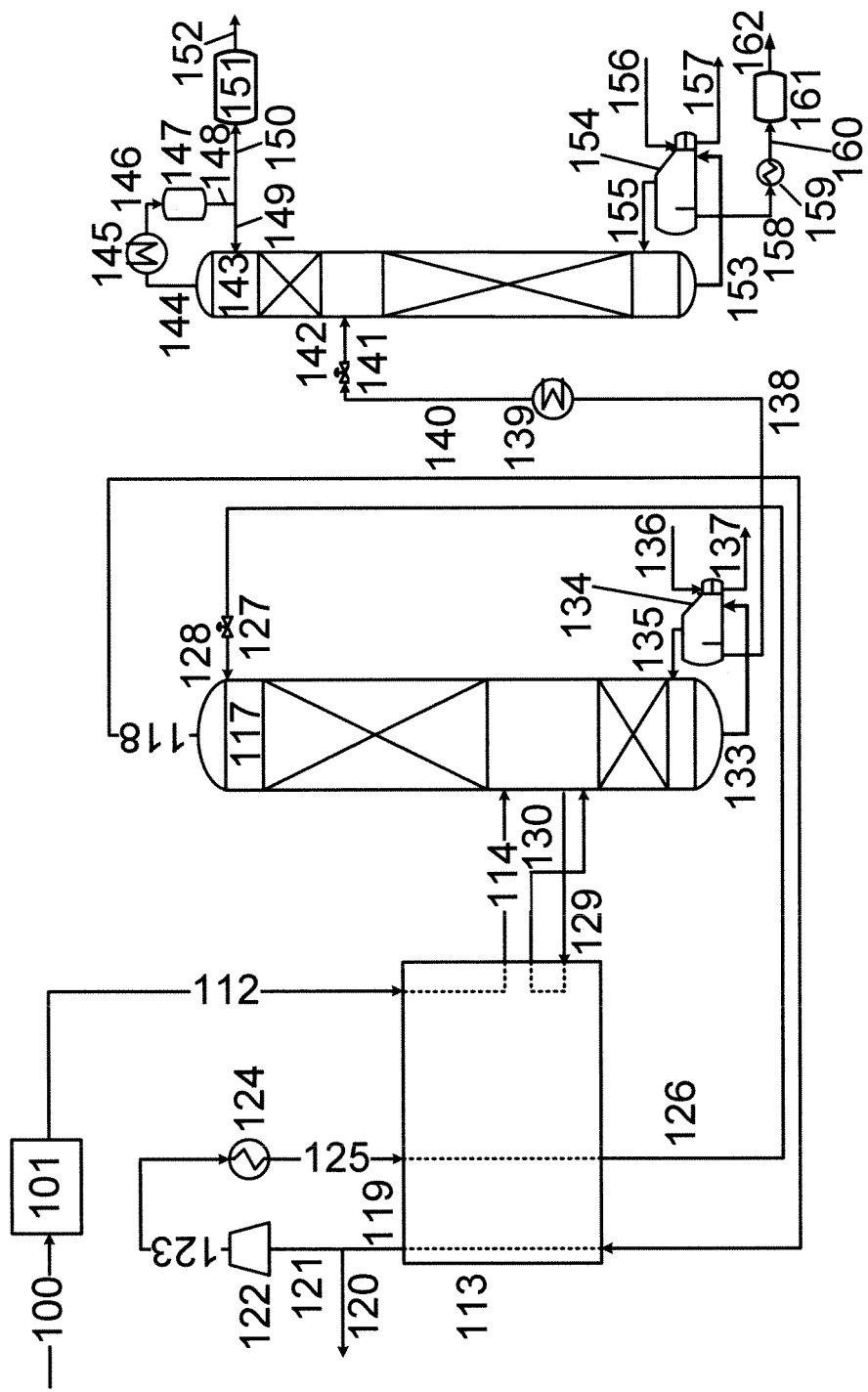
FIG. 1 is a flow sheet depicting an embodiment of the present invention comprising a single stage carbon dioxide heat pump cycle and a distillation column having a side reboiler, in which the $C_{3+}$ hydrocarbon-enriched bottoms liquid is separated in a stabilization column into a "lighter" hydrocarbon product and a "heavier" hydrocarbon product.

All references herein to pressure are references to absolute pressure and not gauge pressure unless expressly stated otherwise. In addition, references to the singular should be interpreted as including the plural and vice versa, unless it is clear from the context that only the singular or plural is meant. Further, unless expressly stated otherwise, fluid compositions are calculated in mol. % on a "dry" basis, i.e. excluding any water content from the calculations. In reality, to avoid operating problems, water content must be low enough, typically no more than 10 ppm, to avoid freeze-out and/or hydrate formation at the cold end of the process.

Overview of the Process

The present invention concerns a process for recovering $C_{3+}$ hydrocarbon compounds from crude carbon dioxide fluid comprising $C_{1+}$ hydrocarbon compounds and at least one non-hydrocarbon "heavy" impurity.

The process comprises feeding dry crude carbon dioxide fluid to a distillation column system for distillation to produce carbon dioxide-enriched overhead vapor comprising $C_1$-$C_3$ hydrocarbon compounds and said non-hydrocarbon "heavy" impurity, and $C_{3+}$ hydrocarbon-enriched bottoms liquid. The distillation column system is reboiled by at least partially vaporizing at least a portion of said $C_{3+}$ hydrocarbon-enriched bottoms liquid and at least one intermediate liquid in or taken from the distillation column system by indirect heat exchange to provide vapor for the distillation column system. Carbon dioxide-enriched overhead vapor and/or a compressed carbon dioxide-enriched recycle gas produced therefrom is cooled and at least partially condensed by indirect heat exchange to produce at least partially condensed carbon dioxide-enriched gas, at least a portion of which is provided as reflux for the distillation column system.

The process has particular application in EOR processes. "EOR" is a generic term for techniques that can be used for increasing the amount of crude oil that can be extracted from an oil field. Gas injection, or miscible flooding, is presently the most-commonly used approach in EOR. These are general terms for injection processes that introduce miscible gases under pressure into the reservoir. A miscible displacement process maintains reservoir pressure and improves oil displacement. The gas most commonly used for miscible displacement is carbon dioxide because it reduces the oil viscosity and is less expensive than using liquefied petroleum gas (LPG). Carbon dioxide dissolved in the extracted oil is recovered by expansion of the oil to desorb the dissolved gases which may then be processed to recover valuable hydrocarbons. The $C_{3+}$ hydrocarbon-depleted carbon dioxide may then recycled to the same EOR process, or used in a different EOR process.

Throughout the specification, the terms "$C_n$" and "$C_{n+}$" are used to refer to specific hydrocarbons or groups of hydrocarbons as appropriate where "n" refers to the number of carbon atoms in the molecules. For example, "$C_{1+}$ hydrocarbons" are hydrocarbons having 1 or more carbon atoms and "$C_{3+}$ hydrocarbons" are hydrocarbons having 3 or more carbon atoms. Hydrocarbons with 3 or more carbon atoms have isomeric forms. The terms "$C_n$" and "$C_{n+}$" are not intended to discriminate between isomers of the hydrocarbons. When particular isomers are being referred to, the usual nomenclature is used. For example, "n-$C_4$" refers to n-butane whereas "i-$C_4$" refers to isobutane.

The term "indirect heat exchange" means that sensible and/or latent heat as appropriate is transferred between fluids without the fluids in question coming into direct contact with each other. In other words, heat is transferred through a wall of a heat exchanger. The term is intended to include the use of an intermediate heat transfer fluid where appropriate.

Crude Carbon Dioxide Fluid

The crude carbon dioxide fluid typically comprises at least about 50 mol. %, or at least about 60 mol %, or at least about 70 mol. %, carbon dioxide. The crude carbon dioxide fluid usually comprises no more than about 95 mol. %, or preferably no more than about 90 mol. %, carbon dioxide. In preferred embodiments, the crude carbon dioxide comprises from about 75 mol. % to about 95 mol. %, preferably from about 80 mol. % to about 90 mol. %, carbon dioxide.

The crude carbon dioxide fluid will also contain $C_{1+}$ hydrocarbons, typically $C_1$-$C_7$ hydrocarbons. Trace amounts, e.g. no more than about 1 or 2 mol. % in total, of higher hydrocarbons, such as $C_8$ and $C_9$ hydrocarbons, may also be present. The amount of $C_1$-$C_7$ hydrocarbons in the crude carbon dioxide fluid depends on the source of the fluid but is typically from about 5 mol. % to about 20 mol. %, e.g. from about 10 mol. % to about 15 mol. %.

The crude carbon dioxide fluid will also contain at least one non-hydrocarbon "heavy" impurity. The term "heavy impurity" in this context means an impurity that is less volatile than carbon dioxide. Hydrogen sulfide is the primary example of a non-hydrocarbon "heavy" impurity. The amount of the non-hydrocarbon "heavy" impurity in general, and of hydrogen sulfide in particular, depends on the source of the fluid but is typically from about 100 ppm to 1000 ppm, e.g. from about 200 ppm to about 600 ppm.

Typically, nitrogen is also present in the crude carbon dioxide fluid. The amount of nitrogen is usually from about 0.5 mol. % to about 5 mol. %.

The crude carbon dioxide fluid is dry to avoid operating problems caused by water freezing-out and/or forming hydrates at the cold end of the process. By "dry", the Inventors mean that the fluid ideally contains no water. However, in reality the "dry" crude carbon dioxide typically contains no more than 10 ppm water.

The temperature of the crude carbon dioxide fluid is selected such that it is appropriate for feeding to an intermediate stage in the distillation column system. The temperature is typically no more than about 120° F. (49° C.), e.g. no more than about 100° F. (38° C.). The temperature of the crude carbon dioxide fluid may be as low as the dew point at the column pressure, e.g. about −30° F. (−34° C.) at 200 psia (1.4 MPa), although the temperature is typically at least about 0° F. (−18° C.), e.g. at least about 20° F. (−7° C.) or at least about 35° F. (2° C.).

The pressure of the crude carbon dioxide fluid is either equal to or greater than the operating pressure of the distillation column system. Where the pressure of the crude carbon dioxide fluid is significantly more than the operating pressure of the column system, the fluid is expanded to about the operating pressure prior to being fed to the column system.

The process of the present invention may be applied to crude carbon dioxide fluid having any suitable flow rate. The flow rate of the crude carbon dioxide fluid may be from about 1 MMscfd or million standard cubic feet per day (0.3 $Nm^3/s$) to about 1000 MMscfd (310 $Nm^3/s$), e.g. 10 MMscfd (3.1 $Nm^3/s$) to 100 MMscfd (31 $Nm^3/s$). Standard conditions vary but it is assumed herein that the standard conditions are 60° F. (16° C.) and 1 atm. Normal conditions are 32° F. (0° C.) and 1.013 bar.

Distillation of Crude Carbon Dioxide

The distillation column system may comprise a single distillation column, a split distillation column where both parts of the column operate at the same pressure, or multiple distillation columns where the columns operate at different pressures. In the latter case, all of the operating pressures would fall within the ranges of pressure given below. In preferred embodiments, however, the distillation column system comprises a single distillation column or a split column. In embodiments involving a split column having two sections where the column sections are preferably located side-by-side and a pump is used to transfer liquid from the bottom of the "upper" section to the top of the "lower" section.

The distillation column system may also comprises at least one vapor/liquid separator to separate a vapor component from reflux liquid for the column system, and/or to separate a liquid component from vapor for the column system generated from partially re-boiled liquid taken from the column system.

At least part of the distillation column system may contain packing and/or vapor/liquid contact trays to improve vapor-liquid contact. Any suitable packing may be used including random packing and structured packing, or any combination thereof. In addition, any suitable vapor/liquid contact trays may used including sieve trays, valve trays and bubble-cap trays, or any combination thereof. The distillation column system may also include liquid distributors and re-distributors to ensure an at least substantially uniform down flow of liquid in the column.

The distillation column system operates above the triple point pressure of carbon dioxide, i.e. above about 75 psia (518 kPa), and below the critical pressure of carbon dioxide, i.e. below about 1070 psia (7.38 MPa). The distillation column system typically operates at a pressure of at least 150 psia (1 MPa), or at least 200 psia (1.3 MPa) or at least 250 psia (1.7 MPa). The distillation column system typically operates at a pressure no more than about 750 psia (5.2 MPa), or no more than about 600 psia (4.2 MPa) or no more than about 500 psia (3.5 MPa). In preferred embodiments, the distillation column system operates at a pressure in the range from about 150 psia (1 MPa) to about 750 psia (5.2 MPa), e.g. from about 200 psia (1.3 MPa) to about 600 psia (4.2 MPa) or from about 250 psia (1.7 MPa) to about 500 psia (3.5 MPa).

The distillation column system is reboiled in part by vaporizing $C_{3+}$ hydrocarbon-enriched bottoms liquid by indirect heat exchange. The bottoms liquid may be reboiled in situ in the sump of the column, or a stream of the liquid may be removed from the column and at least partially vaporised outside the column before being returned to the column. In preferred embodiments, the bottoms liquid is reboiled using a hot oil system.

The distillation column system is also reboiled by vaporizing at least one intermediate liquid by indirect heat exchange. An "intermediate liquid" is a liquid located at an intermediate stage in the distillation column system. The intermediate liquid may be reboiled in situ within the column, or a stream of the liquid may be removed from the column and at least partially vaporized outside the column, e.g. in a side reboiler, before being returned to the column. In preferred embodiments, the intermediate liquid, O/at least one of said intermediate liquids, is at least partially vaporized by indirect heat exchange against carbon dioxide-enriched overhead vapor or compressed carbon dioxide-enriched gas produced therefrom.

Reflux to the column is provided by condensing overhead vapor. The overhead vapor may be condensed by indirect heat exchange in an overhead condenser, or may be condensed during use as the working fluid in a heat pump cycle. All of the condensation duty for the overhead vapor may be provided internally, e.g. in an autorefrigerated process, or at least part of the refrigeration duty may be provided using at least one external refrigeration cycle. Where at least part of the condensation duty is provided internally, the overhead vapor or compressed carbon dioxide-enriched recycle gas derived therefrom is provided using the at least one intermediate liquid.

External refrigeration cycles can use any refrigerant or mixture of refrigerants suitable for the necessary temperatures. However, the external refrigeration cycles preferably use propane as refrigerant.

The $C_3$ component in the crude carbon dioxide is split between the carbon dioxide-enriched overhead vapor and the $C_{3+}$ hydrocarbon-enriched bottoms liquid. Typically, the overhead vapor contains no more than 40%, e.g. no more than 30%, of the $C_3$ component in the feed. The remainder of the $C_3$ component is recovered in the $C_{3+}$ hydrocarbon-enriched bottoms liquid.

In embodiments in which the overhead vapor is used as working fluid in a heat pump cycle and a part of the carbon dioxide-enriched gas is removed as "carbon dioxide product", typically for use in an EOR process (see, for example FIG. 1), then the carbon dioxide product (e.g. stream 120 in FIG. 1) usually comprises no more than 80%, preferably no more than 70%, of the $C_3$ component in the feed. In other words, $C_3$ recovery is at least about 20%, preferably at least about 30%.

In such embodiments involving high propane recovery (see, for example, FIG. 4), then the carbon dioxide product (e.g. stream 120 in FIG. 4) usually comprises no more than 30%, preferably no more than 20%, of the $C_3$ component in the feed. In other words, $C_3$ recovery is at least about 70%, preferably at least about 80%.

Heat Pump Cycle

In preferred embodiments, the process comprises at least one heat pump cycle using as working fluid a fluid from the distillation column system. Suitable fluids from the distillation column system include carbon dioxide-enriched overhead vapor and an intermediate liquid taken from an intermediate stage in the distillation column system.

In embodiments where the working fluid is carbon dioxide-enriched overhead vapor, the process typically comprises:
  warming the carbon dioxide-enriched overhead vapor by indirect heat exchange to produce warmed carbon dioxide-enriched gas;
  compressing at least a portion of the warmed carbon dioxide-enriched gas to produce compressed carbon dioxide-enriched recycle gas at a first pressure;
  after optional aftercooling by indirect heat exchanger, using at least a portion of the compressed carbon dioxide-enriched recycle gas at the first pressure to provide reboiling duty required to at least partially vaporize said intermediate liquid(s) thereby cooling and at least partially condensing said compressed carbon dioxide-enriched recycle gas to produce condensed carbon dioxide-enriched recycle gas; and
  expanding the condensed carbon dioxide-enriched recycle gas to produce the condensed carbon dioxide-enriched gas for use in providing the reflux to the distillation column system.

The first pressure is typically in the range from about 1.3 times to 2.5 times the operating pressure of the distillation column system. Where the distillation column system comprises multiple columns operating at different pressures, the relevant operating pressure is the pressure of the column from which the overhead vapor is taken. In absolute terms, the first pressure is typically in the range from about 500 psia (3.4 MPa) to about 1000 psia (6.9 MPa).

A part of the carbon dioxide-enriched gas may be used in an EOR process after suitable pressure and temperature adjustment. For example, in embodiments in which the crude carbon dioxide fluid is produced in an EOR process, a part of the carbon dioxide-enriched gas is preferably (although not necessarily) recycled to the EOR process producing the crude carbon dioxide fluid. In this regard, the overhead vapor may be divided into two parts, the first part being used as the working fluid in the heat pump cycle and the second part being recycled to the EOR process. The overhead vapor may be divided before or after it is warmed, or even at an intermediate point during warming.

Part of the duty required for cooling and at least partially condensing the compressed carbon dioxide-enriched recycle gas may be provided using an external refrigeration cycle. In such embodiments, the external refrigeration cycle preferably comprises a refrigerant that evaporates at or about the same temperature as the intermediate liquid evaporates when at least partially condensing the compressed carbon dioxide-enriched recycle gas. The external refrigeration cycle may use any suitable refrigerant although the use of propane as refrigerant is preferred.

The heat pump cycle typically comprises a single recycle pressure. However, heat pump cycles having multiple recycle pressures are also contemplated. In such embodiments, the process comprises:
  compressing a portion of the warmed carbon dioxide-enriched recycle gas to produce compressed carbon dioxide-enriched recycle gas at a second pressure that is greater than the first pressure;
  using the compressed carbon dioxide-enriched recycle gas at the second pressure to provide heating duty for the process, thereby cooling and at least partially condensing the compressed carbon dioxide-enriched recycle gas to produce supplemental condensed carbon dioxide-enriched recycle gas;
  expanding the supplemental condensed carbon dioxide-enriched recycle gas to produce expanded carbon dioxide-enriched condensate; and
  using the expanded carbon dioxide-enriched condensate to provide additional reflux to the distillation column system.

The second pressure is typically no more than about 2000 psia (14 MPa), e.g. from about 900 psia (6.2 MPa) to about 2000 psia (14 MPa).

In alternate embodiments, the working fluid is an intermediate liquid taken from an intermediate stage in the distillation column system. In such embodiments, the process typically comprises:
  expanding the intermediate liquid to produce expanded intermediate liquid;
  vaporising the expanded intermediate liquid by indirect heat exchange against carbon dioxide-enriched overhead vapor to produce vaporized intermediate liquid and at least partially condensed carbon dioxide-enriched overhead vapor;

compressing at least a portion of the vaporized intermediate liquid to produce compressed intermediate recycle gas at a first pressure;

cooling the compressed intermediate recycle gas by indirect heat exchange to produce cooled intermediate gas; and feeding the cooled intermediate gas to the distillation column system.

At least a portion of the carbon dioxide-enriched condensate is typically used to provide reflux to the distillation column system. Additionally or alternatively, the vaporized intermediate liquid is typically warmed by indirect heat exchange prior to compression to form the compressed intermediate recycle gas.

The intermediate liquid is typically withdrawn at or below the location of the feed to the distillation column system. The cooled intermediate gas is typically returned to the distillation column system at (or close to) the location from which the liquid is withdrawn. At least a portion of the cooled intermediate gas may be mixed with the feed to the distillation column system, either before or after compression.

In embodiments where an intermediate liquid is used as the working fluid of the heat pump cycle, the first pressure is usually at least substantially equal to the operating pressure of the distillation column system, e.g. from about 200 psia (1.3 MPa) to about 600 psia (4.2 MPa).

$C_{3+}$ hydrocarbon bottoms liquid

The $C_{3+}$ hydrocarbon-enriched bottoms liquid may be removed from the distillation column system as a final product and sold. Alternatively, the bottoms liquid may be further processed.

If the $C_{3+}$ hydrocarbon-enriched bottoms liquid comprises a significant quantity, e.g. at least about 2 ppm, of carbonyl sulfide (COS), it may be desirable to remove at least a portion of the COS from the $C_{3+}$ hydrocarbon-enriched bottoms liquid. COS may be removed from the bottoms liquid using any appropriate technique. Examples of conventional techniques for COS removal that may be applied in this context include absorption using solvents such as amines; adsorption; or using a KOH-methanol system.

At least substantially all of any hydrogen sulfide in the crude carbon dioxide fluid is preferably rejected in the distillation column system as a component in the overhead vapor. In these embodiments, the amount of hydrogen sulfide in the bottoms liquid is usually no more than 2 ppm. However, in some embodiments, the bottoms liquid will comprise a significant quantity of hydrogen sulfide, perhaps in an amount of up to 100 ppm, for example from about 10 ppm to about 50 ppm, e.g. from about 30 ppm to about 40 ppm. Such an amount of hydrogen sulfide may be referred to as "residual" hydrogen sulfide. In such embodiments, the process may comprise removing at least a portion of the residual $H_2S$ from the bottoms liquid.

Hydrogen sulfide may be removed from the bottoms liquid any appropriate conventional technique. However, in preferred embodiments, the hydrogen sulfide is removed by chemisorption, for example on a sacrificial chemisorbent. A sacrificial chemisorbent is a material, e.g. a metal oxide such as zinc oxide, upon which the hydrogen sulfide is irreversibly chemisorbed and thus cannot be regenerated. The chemisorbent is therefore used and discarded.

The $C_{3+}$ hydrocarbon-enriched bottoms liquid comprises a mixture of valuable hydrocarbons. Therefore, in preferred embodiments, the $C_{3+}$ hydrocarbon-enriched bottoms liquid is separated into at least a "lighter" hydrocarbon fraction and a "heavier" hydrocarbon fraction. The separation typically comprises:

feeding the $C_{3+}$ hydrocarbon-enriched bottoms liquid to a stabilization column system for separation into at least a "lighter" hydrocarbon-enriched overhead vapor and a "heavier" hydrocarbon-enriched bottoms liquid;

at least partially condensing a portion of the "lighter" hydrocarbon-enriched overhead vapor by indirect heat exchange to produce at least partially condensed "lighter" hydrocarbon-enriched overhead vapor;

using a first portion of the at least partially condensed "lighter" hydrocarbon-enriched overhead vapor to provide reflux to the stabilization column system;

removing a second portion of the at least partially condensed "lighter" hydrocarbon-enriched overhead vapor as the "lighter" hydrocarbon fraction;

reboiling the stabilization column system by at least partially vaporizing at least a portion of the "heavier" hydrocarbon-enriched bottoms liquid in or taken from said stabilization column system by indirect heat exchange to produce vapor for the stabilization column system; and removing a portion of the "heavier" hydrocarbon-enriched bottoms liquid as the "heavier" hydrocarbon-enriched fraction.

The stabilization column system typically comprises a single distillation column although other distillation column systems, e.g. split columns operating at substantially the same pressure or multiple columns operating at different pressures, are contemplated where appropriate. At least a portion of the column(s) may be packed or trayed as discussed above as appropriate.

The stabilization column system typically operates at a pressure from about 50 psia (0.3 MPa) to about 300 psia (2 MPa). Therefore, the $C_{3+}$ hydrocarbon-enriched bottoms liquid is typically expanded prior to being fed to the stabilization column system. Additionally, the $C_{3+}$ hydrocarbon-enriched bottoms liquid is usually cooled by indirect heat exchange prior to being fed the stabilization column system.

The "lighter" hydrocarbon fraction typically contains predominantly $C_3$-$C_5$ hydrocarbons and may be referred to as a Y-grade NGL. The "heavier" hydrocarbon fraction typically contains predominanty $C_5$-$C_7$. Where the "lighter" hydrocarbon fraction comprises a significant amount, e.g. at least about 2 ppm, of COS, the process may comprising removing at least a portion of the COS from the "lighter" hydrocarbon fraction. COS may be removed from the bottoms liquid using an appropriate conventional technique such as the examples listed above.

The $C_{3+}$ hydrocarbon-enriched bottoms liquid is preferably separated by distillation using a pre-determined set of conditions to maximize the economic value of the final products, i.e. a blended crude oil and a final Y-grade NGL, when the price information is provided. This is achiveable by optimizing the split of each component between crude oil and Y-grade NGL without contravening contractual specifications regarding properties of the blend oil. The crude oil may for example be the crude oil extracted using the EOR process that produces the crude carbon dioxide fluid from which the bottoms liquid is obtained.

The economic value of the Y-grade NGL is usually the sum of the value of each component (from $C_3$ to $C_7$). The reflux ratio and the boilup ratio of the distillation column are adjustable variables to control the splitting between blended oil and Y-grade NGL. This optimization process can be worked out using a commercially available software package such as Aspen™ Plus (Aspen Technology, Inc). Once the reflux ratio and boilup ratio of the column is determined, the conditions of all the streams and the column are known.

At least one of the properties of the blend oil is preferably selected from the group consisting of API gravity, Reid Vapor Pressure and viscosity.

American Petroleum Industry (or API) gravity is measure of the density of oils to relative to water. If an oil has an API gravity greater than 10, it is lighter than water would float in water. If an oil has an API gravity less than 10, it is heavier than water and would sink in water. API gravity is mathematically unitless but is often quoted in degrees. Generally speaking, oil with an API gravity between 40° and 45° commands the highest prices.

Crude oil is classified as light, medium or heavy, according to its measured API gravity. Light crude oil is defined as having an API gravity higher than 31.1° (870 kg/m$^3$); medium crude oil is defined as having an API gravity between 22.3° and 31.1° (870 to 920 kg/m$^3$); and heavy crude oil is defined as having an API gravity below 22.3° (920 to 1000 kg/m$^3$). Extra heavy oil is defined with API gravity below 10.0° (greater than 1000 kg/m$^3$). Crude oil can be up-graded by the addition of lighter hydrocarbons.

API gravity may be measured directly using a hydrometer, for example in accordance with the method of ASTM D287.

In one example of the present invention, the API gravity is typically controlled to be less than or equal to 50°.

Reid Vapor Pressure (RVP) is a common measure of the volatility of gasoline. It is defined as the absolute vapor pressure exerted by a liquid at 100° F. (37.8° C.) as determined by the test method ASTM D323. The RVP of an oil may be manipulated by the addition of lighter or heavier hydrocarbons.

The RVP is controlled to be less than or equal to about 10 psi (69 kPa) in order to meet the oil specification in one example of the present example. A typical RVP range for crude oil may be about 8 (55 kPa) psi to about 14 psi (97 kPa).

Viscosity defines the resistance of a fluid, such as hydrocarbon oil, to shear or flow. There are two related measures of viscosity, absolute (or dynamic) viscosity and kinematic viscosity.

Absolute viscosity is a measure of the internal resistance of the fluid and may be measured using a viscometer such as a Houillon viscometer and determined by the test method ASTM D7042-12a. The absolute viscosity of a hydrocarbon oil may be manipulated by the addition of lighter or heavier hydrocarbons.

Kinematic viscosity is the ratio of the absolute viscosity of the fluid to its density. The kinematic viscosity may be measured using a viscometer such as a capiliary tube viscometer or a rotational viscometer, e.g. a Stabinger viscometer, and determined by the test method ASTM D7279-08 or ASTM D445. As with absolute viscosity, the kinematic viscosity of a hydrocarbon oil may also be manipulated by the addition of lighter or heavier hydrocarbons. A typical kinematic viscosity range for crude oil is from about 3 centiStokes ($3 \times 10^{-6}$ m$^2$/s) to about 24 centiStokes ($24 \times 10^{-6}$ m$^2$/s) at 60° F. (16° C.).

In the present invention, different blending options are contemplated. For example, at least a portion of the "heavier" hydrocarbon fraction may blended with crude oil to produce a blended oil.

In other embodiments, where the $C_{3+}$ hydrocarbon-enriched bottoms liquid is also separated into an intermediate hydrocarbon fraction, at least a portion of the intermediate hydrocarbon fraction may be blended with crude oil to produce a blended oil. In these embodiments, at least a portion of the "heavier" hydrocarbon fraction may be blended with the "lighter" fraction to produce a Y-grade NGL.

In still further embodiments, a portion of the "heavier" hydrocarbon fraction may be blended with the "lighter" hydrocarbon fraction to produce a Y-grade NGL.

Improving Propane Recovery

In embodiments where it is desirable to improve propane recovery, a portion of the "heavier" hydrocarbon fraction may be recycled to the distillation column system at a location above the location at which the dry crude carbon dioxide fluid is fed to the distillation column system. The portion of the "heavier" hydrocarbon fraction for recycling is cooled by indirect heat exchange prior to being fed to the distillation column system.

The recycled hydrocarbons ($C_{4+}$) help increase the relative volatility for the carbon dioxide/propane system (see paper entitled *Use of Ryan Holmes technology for $CO_2$ and NGL recovery* presented by Brown, B. D. and O'Brien, J. V. at the 77$^{th}$ GPA Annual Convention in 1998) and minimize the utility consumption.

The invention will now be further described with reference to preferred embodiments depicted in FIGS. 1 to 6.

Details of a typical crude carbon dioxide gas produced in an EOR process forming the feed stream 100 in the figures is provided in Table 1 below.

TABLE 1

| Total Flow 50 MMscfd (15.5 Nm$^3$/s) Temperature 104° F. (40° C.) Pressure 400 psia (2.8 MPa) Component (mol. %) | | | |
|---|---|---|---|
| N$_2$ | 2.0 | n-C$_4$ | 0.35 |
| CO$_2$ | 85.7 | i-C$_4$ | 0.35 |
| H$_2$S | 0.03 | n-C$_5$ | 0.32 |
| C$_1$ | 5.0 | i-C$_5$ | 0.30 |
| C$_2$ | 3.3 | n-C$_6$ | 0.52 |
| C$_3$ | 1.66 | n-C$_7$ | 0.47 |

In FIG. 1, the stream 100 of crude carbon dioxide gas from the EOR process (not shown) is fed to a pre-treatment unit 101 which includes one or more units selected from a cooling system, for example a propane refrigeration system (not shown); a phase separator (not shown) to remove liquid condensate from the gas; a dryer system (not shown) involving, for example, a glycol (e.g. triethylene glycol or TEG) dehydration unit, or an adsorbent, e.g. zeolite or molecular sieve; and a mercury removal system (not shown). Water could be condensed by the cooling system, thereby improving performance of the dryer system with reduced power consumption. The phase separator could be a two-phase separator (rejecting all liquid condensate as a single stream), or the three-phase separator (rejecting water-rich condensate separately from hydrocarbon-rich condensate). Where a two-phase separator is used, the liquid condensate may be combined with other crude oil streams. Where a three-phase separator is used, the water-rich condensate may be discarded and the hydrocarbon-rich liquid may be either combined with other crude oil streams for further water removal, or may be sent to distillation column 117 (see below) for further processing.

A stream 112 of pre-treated crude carbon dioxide gas is cooled by indirect heat exchange in a primary heat exchanger 113 to a temperature of about 53° F. (12° C.) to produce a stream 114 of cooled crude carbon dioxide fluid which is fed to an intermediate stage of a distillation column 117 operating at about 400 psia (2.8 MPa). The crude carbon dioxide fluid is separated in the distillation column 117 into a carbon dioxide-enriched overhead vapor 118 and $C_{3+}$ hydrocarbon-enriched bottoms liquid 133.

Hydrocarbon recovery in the bottoms liquid 133 is typically about 30% propane ($C_3$), 90% butane (n-$C_4$ and i-$C_4$), and nearly all pentanes (n-$C_5$ and i-$C_5$) and heavier hydrocarbons ($C_{6+}$). Since hydrogen sulfide is rejected in the overhead vapor, the bottoms liquid is essentially free of hydrogen sulfide, i.e. has no more than 1 ppm $H_2S$. The overhead vapor 118 contains predominantly carbon dioxide, hydrogen sulfide, nitrogen (and any other non-condensible gases) and the methane ($C_1$), ethane ($C_2$) and the rest of the propane ($C_3$).

The stream 118 of overhead vapor is warmed in the main heat exchanger 113 and then split into two portions. The first portion is the purified carbon dioxide product which is sent as stream 120 for further compression (not shown) and re-injection in the EOR process (not shown).

The second portion is used as the working fluid in a heat pump cycle and thus is fed as stream 121 to a compressor 122 where it is compressed to 850 psia (5.9 MPa) to form compressed stream 123 which is cooled by indirect heat exchange in aftercooler 124 to form recycle stream 125. Stream 125 is cooled and condensed in the main heat exchanger 113 to form liquid stream 126 at 16° F. (−9° C.). Stream 126 is then expanded across valve 127 to produce an expanded stream 128 at about 400 psia (2.7 MPa) which is fed to the top of distillation column 117 as reflux.

A stream 129 of liquid taken from an intermediate stage of distillation column 117 (an "intermediate liquid") is partially vaporized by indirect heat exchange in the main heat exchanger 113 against the compressed gas in recycle stream 125, and the partially vaporized liquid is returned as stream 130 to an intermediate stage of distillation column 117. This side reboiler provides a significant proportion of the boilup duty for the distillation column 117. The remainder of the boilup duty is provided by the bottom reboiler 134, which is heated with a hot oil system (136 and 137). The advantage of the intermediate reboiler is that it significantly reduces the required heat duty of the hot oil system in the bottom reboiler, thereby reducing energy consumption.

Below the side reboiler, the column 117 primarily strips hydrogen sulfide out of the hydrocarbon liquids to achieve the required hydrogen sulfide specifications on the natural gas liquids. The vapor flow below the side reboiler is significantly lower than above it, so the column diameter can be significantly smaller below the side reboiler than above the side reboiler.

The hydrocarbon bottoms liquid can be removed from the distillation column 117 and sold as an NGL product (not shown). Alternatively, the bottoms liquid can be withdrawn from the distillation column 117 and separated into different hydrocarbon fractions in an NGL stabilization column 143. In this embodiment, a stream 138 of bottoms liquid is removed from the distillation column 117 and cooled by indirect exchange in aircooler 139 to form cooled stream 140. Stream 140 is expanded across valve 141 and the expanded stream 142 is fed to the stabilization column 143 where it is separated into an overhead fraction comprising predominately the lighter hydrocarbons in gaseous form, and a bottom fraction comprising predominantly the heavier hydrocarbons in liquid form. The pressure of the stabilization column 143 is from about 100 psia (0.7 MPa) to about 200 psia (1.4 MPa).

A stream 144 of the overhead vapor is condensed by indirect heat exchange in aircooler 145 and the condensate collected in a reflux drum 147. The condensate of lighter hydrocarbons is often referred to as a Y-grade NGL. A stream 148 of the condensed liquid is removed from the reflux drum 147 and a portion 149 of the condensed liquid is returned to the top of the stabilization column 143 as reflux. The remaining portion 150 of the condensed liquid is sent to a storage tank 151 and sold as Y-grade NGL (stream 152).

A stream 153 of the bottom fraction is partially boiled in a bottom reboiler 154. The energy for the reboiler can be supplied by a hot-oil system (156 and 157). A stream 155 of vapor is fed from the bottom reboiler 154 to the bottom of the stabilization column 143 to provide vapor for the column. A liquid hydrocarbon stream 158 is removed from the bottom reboiler 154, cooled by indirect heat exchange in cooler 159 and fed as stream 160 to a storage tank 161. A stream 162 of the "heavier" liquid hydrocarbons may be removed from the tank 161 and sold.

An example of the compositions of the overhead vapor and bottoms liquid from the distillation column 117 and of the product streams from the stabilization column 143 in FIG. 1 is provided in Table 2 below. These data have been generated by computer simulation using Aspen™ Plus software (version 7.2; © Aspen Technology, Inc.) on the basis of the information provided in Table 1 above regarding the crude carbon dioxide feed stream 100.

TABLE 2

| Stream No. | 120 | 118 | 128 | 142 | 152 | 162 |
|---|---|---|---|---|---|---|
| $CO_2$ | 0.882 | 0.882 | 0.882 | <1 ppm | <1 ppm | <1 ppm |
| $N_2$ | 0.020 | 0.020 | 0.020 | <1 ppm | 0 | 0 |
| $C_1$ | 0.051 | 0.051 | 0.051 | <1 ppm | 0 | 0 |
| $C_2$ | 0.034 | 0.034 | 0.034 | <1 ppm | <1 ppm | <1 ppm |
| $C_3$ | 0.012 | 0.012 | 0.012 | 0.181 | 0.321 | <1 ppm |
| $C_4$ | 86 ppm | 86 ppm | 86 ppm | 0.123 | 0.218 | 2 ppm |
| $C_5$ | <1 ppm | <1 ppm | <1 ppm | 0.115 | 0.085 | 0.154 |
| $H_2S$ | 308 ppm | 308 ppm | 308 ppm | 1 ppm | 2 ppm | <1 ppm |
| i-$C_4$ | 241 ppm | 241 ppm | 241 ppm | 0.117 | 0.208 | <1 ppm |
| i-$C_5$ | <1 ppm | <1 ppm | <1 ppm | 0.108 | 0.165 | 0.033 |
| $C_6$ | <1 ppm | <1 ppm | <1 ppm | 0.187 | 0.003 | 0.425 |
| $C_7$ | <1 ppm | <1 ppm | <1 ppm | 0.169 | 103 ppm | 0.388 |
| WATER | 0 | 0 | 0 | 0 | 0 | 0 |
| Temperature ° F. (° C.) | 109.9 (43) | 8.4 (−13) | −6.0 (−21) | 145.0 (63) | 137.7 (59) | 125.0 (52) |
| Pressure psia (MPa) | 389.3 (2.7) | 392.2 (2.7) | 392.2 (2.7) | 395.0 (2.7) | 140.0 (1) | 140.6 (1) |

TABLE 2-continued

| Stream No. | 120 | 118 | 128 | 142 | 152 | 162 |
|---|---|---|---|---|---|---|
| Vapor Fraction | 1 | 1 | 0.22 | 0 | 0 | 0 |
| Total Flow lbmol/hr | 5337.3 | 8008.5 | 2671.2 | 152.7 | 86.1 | 66.6 |
| Total Flow lb/hr | 222945 | 334525 | 111580 | 10851.7 | 4929.2 | 5922.5 |
| Total Flow cuft/hr | 74531.3 | 77095.7 | 7357.6 | 300.7 | 152.8 | 149.4 |

In FIG. 1, the condensing duty and part of the boiling duty in distillation column 117 are provided by a single-stage carbon dioxide heat pump. In other embodiments, a multi-stage carbon dioxide heat pump can be used and/or an external propane refrigeration system can partially or entirely replace the carbon dioxide heat pump cycle.

Figure 2A:
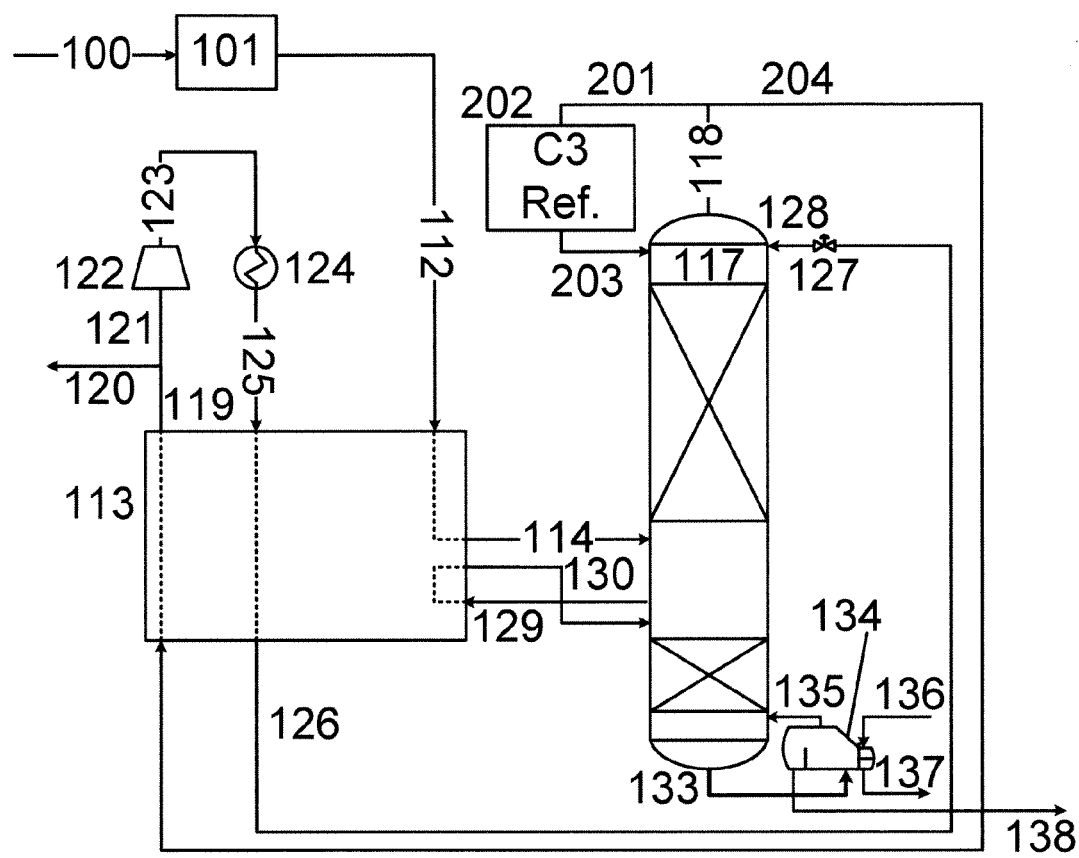
FIG. 2(a) is flow sheet depicting a different arrangement of the distillation column of FIG. 1 in which part of the refrigeration duty for cooling and condensing the overhead vapor is provided by an external propane refrigeration cycle.
Figure 2B:
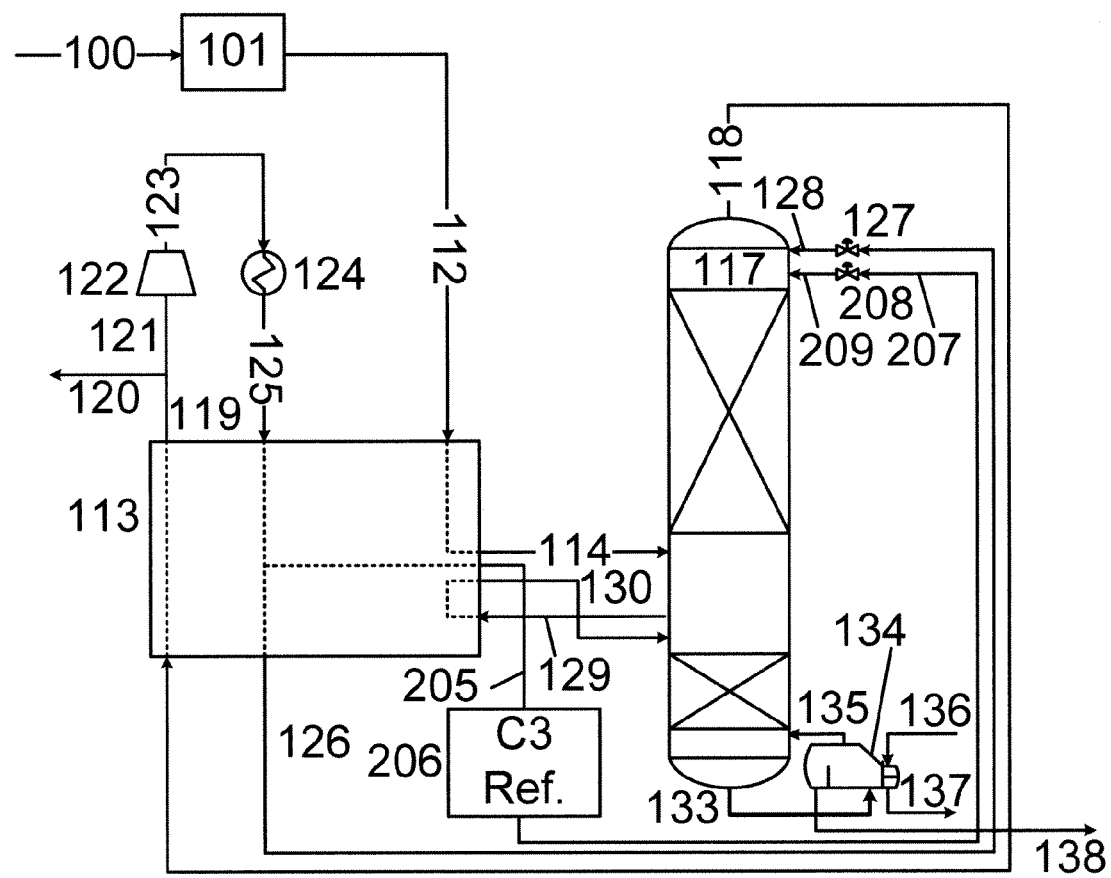
FIG. 2(b) is flow sheet depicting another arrangement of the distillation column of FIG. 1 in which part of the refrigeration duty required for cooling and condensing the recycle gas in the heat pump is provided by an external propane refrigeration cycle.
Figure 2C:
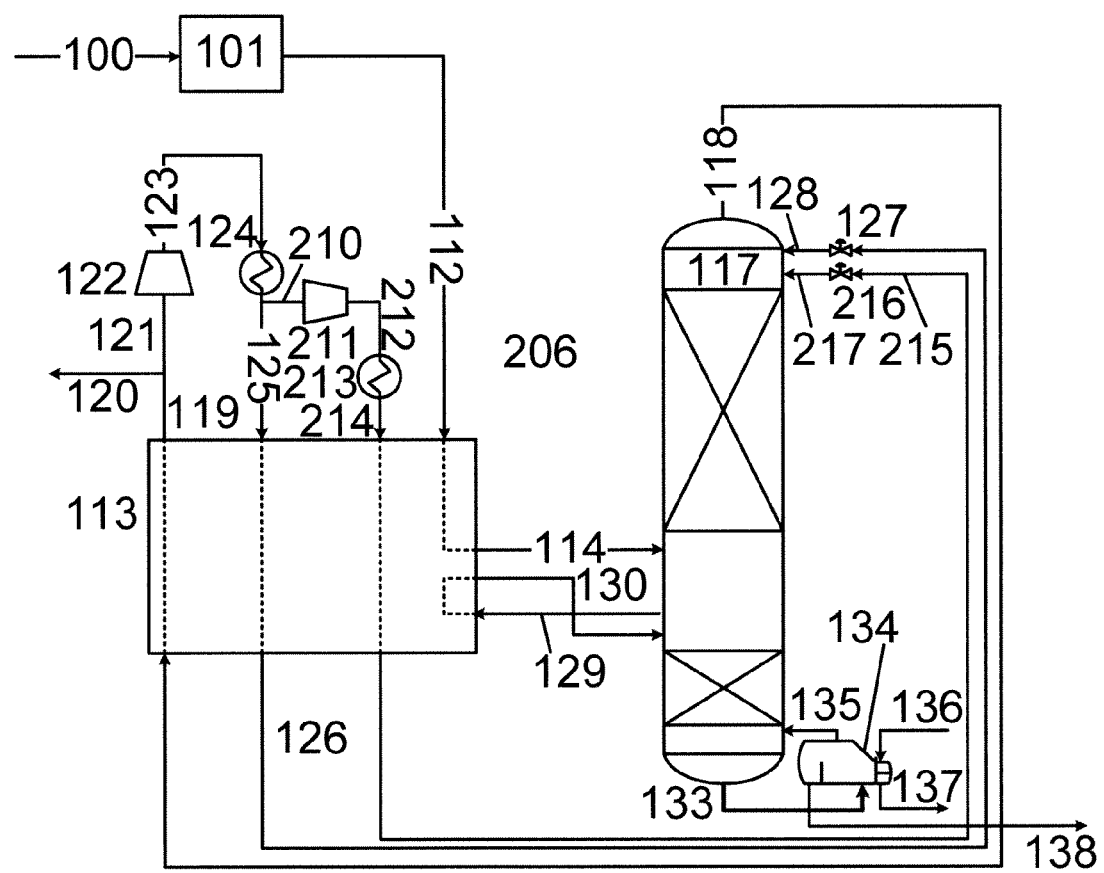
FIG. 2(c) is flow sheet depicting a further arrangement of the distillation column of FIG. 1 in which the heat pump cycle involves two recycle pressures.

The processes depicted in FIGS. 2(a) to (c) are modifications of the initial distillation step of FIG. 1 in which the crude carbon dioxide fluid is separated into carbon dioxide-enriched overhead vapor and hydrocarbon-enriched bottoms liquid in distillation column 117. The features of FIGS. 2(a) to (c) which are common to FIG. 1 have been given the same reference numerals. The following is a discussion of the features of FIGS. 2(a) to (c) that distinguish the processes over that depicted in FIG. 1.

In FIG. 2(a), an external propane refrigeration system is used to provide condensing duty for distillation column 117 at the overhead temperature, with the $CO_2$ heat pump cycle still being used to provide some reboiling duty. Stream 118 of overhead vapor is divided into two portions. A first portion 204 is fed to the main heat exchanger 113 as in FIG. 1. However, the second portion 201 is fed to the propane refrigeration system 202 where it is condensed and then returned to the top of the distillation column 117 as reflux (203).

In FIG. 2(b), only part of the heat pump recycle stream 125 is condensed in the primary heat exchanger 113. Stream 125 is divided into two portions. The first portion is condensed in the main heat exchanger 113 as in FIG. 1. However, the second portion 205 is condensed by an external propane refrigeration system 206 at the side reboiler temperature. FIG. 2(b) shows stream 125 being divided at an intermediate point within the primary heat exchanger 113 which thereby provides initial cooling for the entire stream but does not condense the stream. However, the stream could be divided at another location, for example before being fed to the primary heat exchanger 113 (in which case, the external refrigeration system would also provide initial cooling to that part of the recycle gas) or at an another intermediate location within the main heat exchanger downstream of the location identified in FIG. 1 (in which case, the divided stream would be partially condensed and the propane refrigeration cycle would complete the condensation). The condensed second portion 207 is expanded in valve 208 and fed to the top of the distillation column 117 as reflux 209.

In FIG. 2(c), the carbon dioxide heat pump cycle has two recycle pressures. The cooled compressed carbon dioxide-enriched gas from the aftercooler 124 is divided into two portions. The first portion 125 at the first pressure generated by the compressor 122 is fed to the primary heat exchanger 113 and used to provide the reboil duty in the side reboiler as in FIG. 1. However, the second portion 210 is compressed further in a second compressor 211 to a second pressure of no more than about 2000 psia (14 MPa) and is then aftercooled in aftercooler 213 and fed to the primary heat exchanger 113 as stream 214 to help warm the carbon dioxide-enriched overhead vapor by indirect heat exchange to ambient temperature. The further compressed stream 214 from the high pressure heat pump compressor does not necessarily need cooling in the primary heat exchanger 113, although the power consumed by the process is reduced if it is cooled. In addition, the further compressed stream could come from a carbon dioxide product compression system to avoid an extra compressor.

The processes depicted in FIGS. 3(a) to (c) are modifications of the second distillation step of FIG. 1 in which the $C_{3+}$ hydrocarbon-enriched bottoms liquid from distillation column 117 is separated into a "lighter" hydrocarbon fraction and a "heavier" hydrocarbon fraction in stabilization column 143. The features of FIGS. 3(a) to (c) which are common to FIG. 1 have been given the same reference numerals. The following is a discussion of the features of FIGS. 3(a) to (c) that distinguish the processes over that depicted in FIG. 1.

In FIG. 3(a), the split of the hydrocarbons in the stabilization column 143 is designed such that maximum amount of heavier NGLs (stream 162) can be blended to the crude oil 300 produced on the EOR site (where the crude carbon dioxide gas feed is produced) without exceeding the contractual specifications on the properties of the oil blend, typically the API gravity and Reid Vapor Pressure (RVP) specifications.

In the case that pricing information for the Y-grade NGL and crude oil is known, the blending strategy can be further improved by maximizing the economic value of the final products. For example, in the case that the price spread of $C_4$ to the crude oil is large enough to justify blending $C_4$ instead of heavier hydrocarbons ($C_{5+}$) to the crude oil, at least two alternative strategies can be considered as shown in FIGS. 3(b) and 3(c).

In FIG. 3(b), an intermediate (or "side") product 302 (containing primarily $C_4$ and $C_5$ hydrocarbons) can be taken from an intermediate stage of stabilization column 143 to blend with the crude oil 300. The overhead and bottom streams may be combined and sold as Y-grade NGL 152.

In FIG. 3(c), most of the $C_4$ is recovered in the bottom of the column and a portion of the bottom product 307 is blended with the oil 300. The rest of the bottom stream 306 and the overhead stream may be combined and sold as Y-grade NGL 152.

Figure 4:
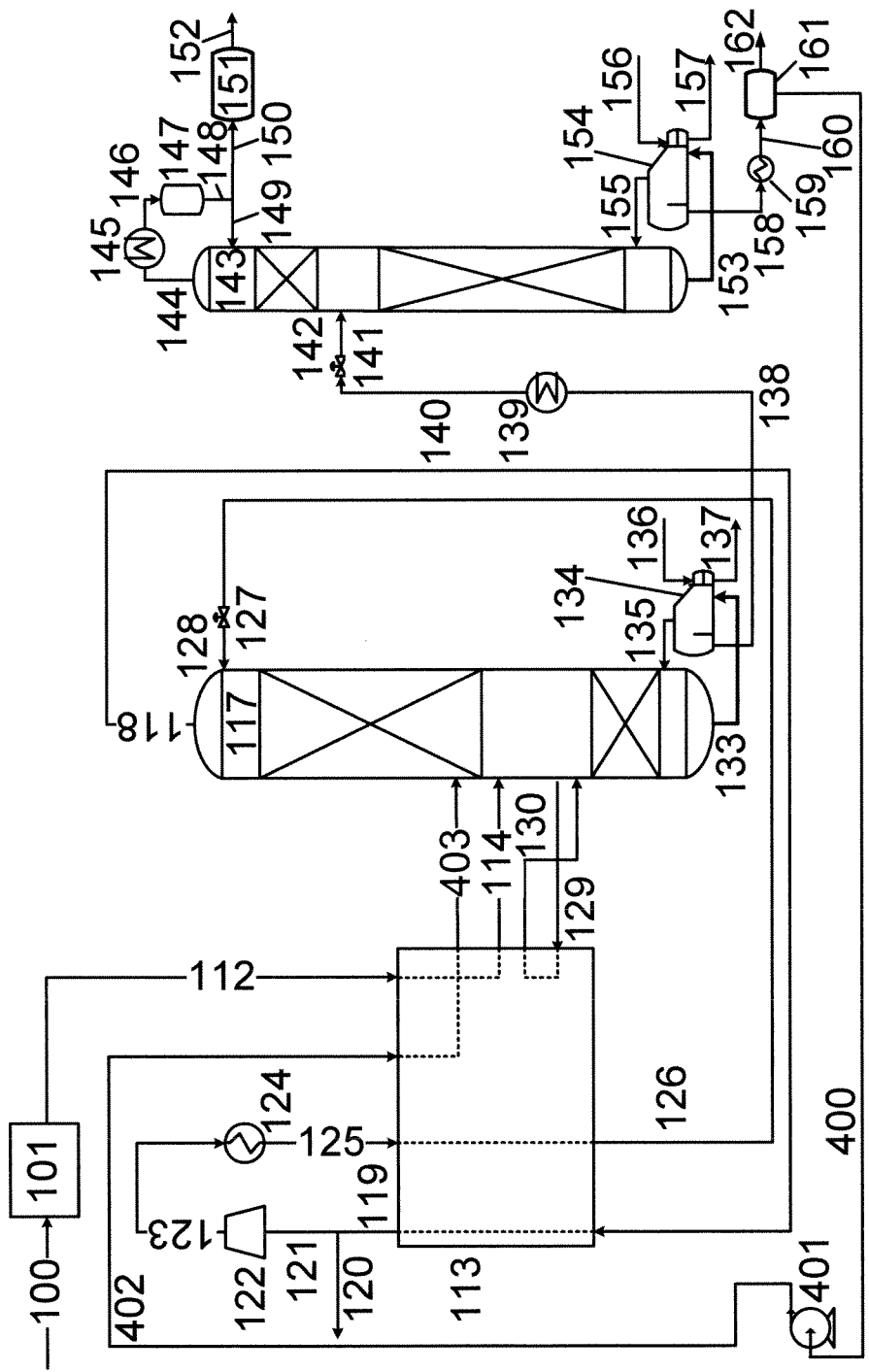
FIG. 4 is a flow sheet depicting a modified version of the embodiment depicted in FIG. 1 in which a portion of the "heavier" hydrocarbon product is recycled from the stabilization column system to the distillation column.

The process depicted in FIG. 4 is a modification of the process depicted in FIG. 1 in which a portion 400 of the "heavier" hydrocarbon fraction is recycled to an intermediate location of the distillation column 117 by pump 401. The features of FIG. 4 which are common to FIG. 1 have been given the same reference numerals. The following is a discussion of the features of FIG. 4 that distinguish the process over that depicted in FIG. 1.

Figure 3:
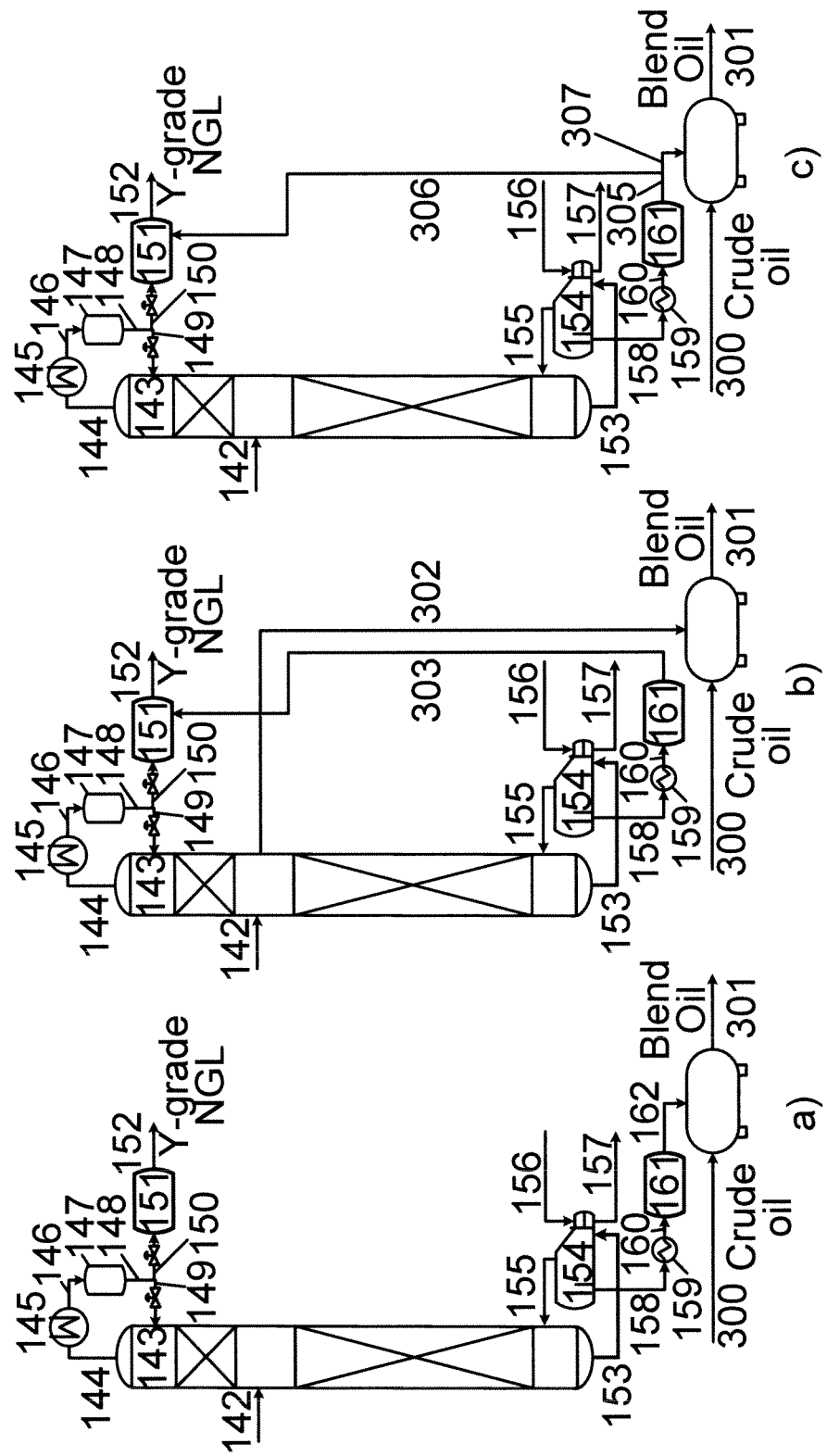
FIG. 3(a) is a flow sheet depicting the stabilization column of FIG. 1 in which the "heavier" hydrocarbon product is blended with crude oil.
FIG. 3(b) is a flow sheet depicting a different arrangement in which an intermediate hydrocarbon product is blended with the crude oil and the "heavier" hydrocarbon product is blended with the "lighter" hydrocarbon product.
FIG. 3(c) is a flow sheet depicting a further arrangement in which the "heavier" hydrocarbon product is blended with both the crude oil and the "lighter" hydrocarbon product.

The flow sheets of FIGS. 1 and 3 depict processes that are most suitable to achieve relatively low propane recovery (e.g. less than 35%). Increasing propane recovery typically means that the required condensing and boilup duties increase significantly, resulting in higher power consumption. Where high propane recovery is desirable, FIG. 4 shows an improved solution targeting high propane recovery (greater than 90%) in column 117 with minimal additional capital investment.

Compared to the original cycle shown in FIG. 1, the process of FIG. 4 requires recycling a portion 400 of the heavier NGL product from tank 160 at ambient temperature, cooling it in the primary heat exchanger 113 (or in a separate cooler) and feeding it (403) to an intermediate stage of the distillation column 117 above the feed stage. Compared to FIG. 1, the boilup at the bottom of the distillation column 117 will increase in proportion to the NGLs (including the recycle stream), so the side reboiler duty and carbon dioxide heat pump flow will be reduced as $C_3$ recovery increases. The flow in the stabilization column 143 will also increase in proportion to the total NGLs, leading to an increase in the column size and the reboiler and condenser duties.

Figure 5:
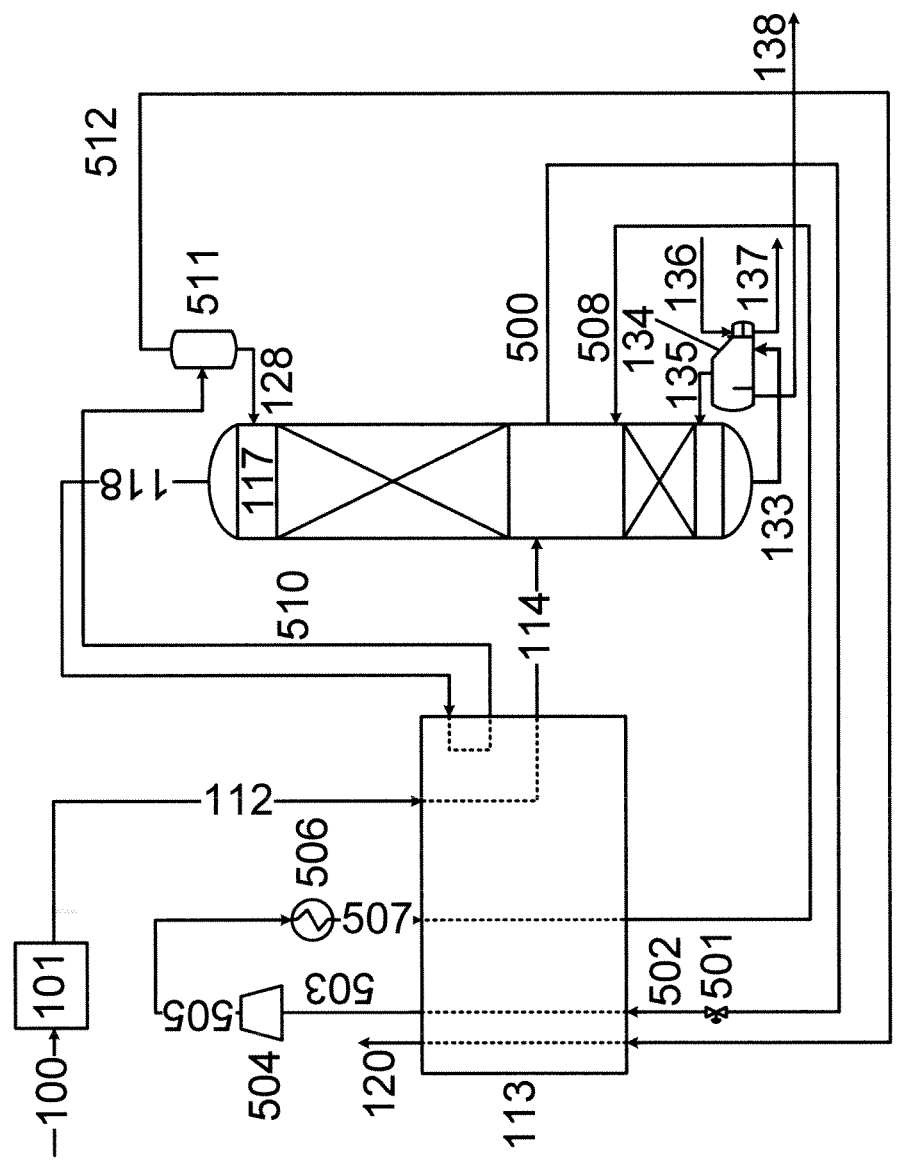
FIG. 5 is a flow sheet depicting a modified version of the embodiment depicted in FIG. 1 in which the working fluid for the heat pump cycle is a fluid taken from an intermediate stage of the distillation column.

The process depicted in FIG. 5 is a modification of the process depicted in FIG. 1 in which a fluid from an intermediate location of the distillation column 117 is used in a heat pump cycle. The features of FIG. 5 which are common to FIG. 1 have been given the same reference numerals. The following is a discussion of the features of FIG. 5 that distinguish the process over that depicted in FIG. 1.

In FIG. 5 an intermediate liquid 500 from the distillation column 117 is expanded in valve 501 and evaporated in heat exchanger 113 against overhead vapor 118 as it partially condenses to form stream 510. Stream 510 is separated in reflux separator 511, from which the liquid 128 is returned to column 117 as reflux and the vapor 512 is warmed in main heat exchanger 113 to form the $CO_2$ product 120. Evaporated and warmed intermediate liquid 503 is compressed in compressor 504, cooled in aftercooler 506, and recooled in the main heat exchanger 113. The cooled vapor 508 is returned to the column 117 to the intermediate location from which the liquid was withdrawn to provide boilup.

Figure 6:
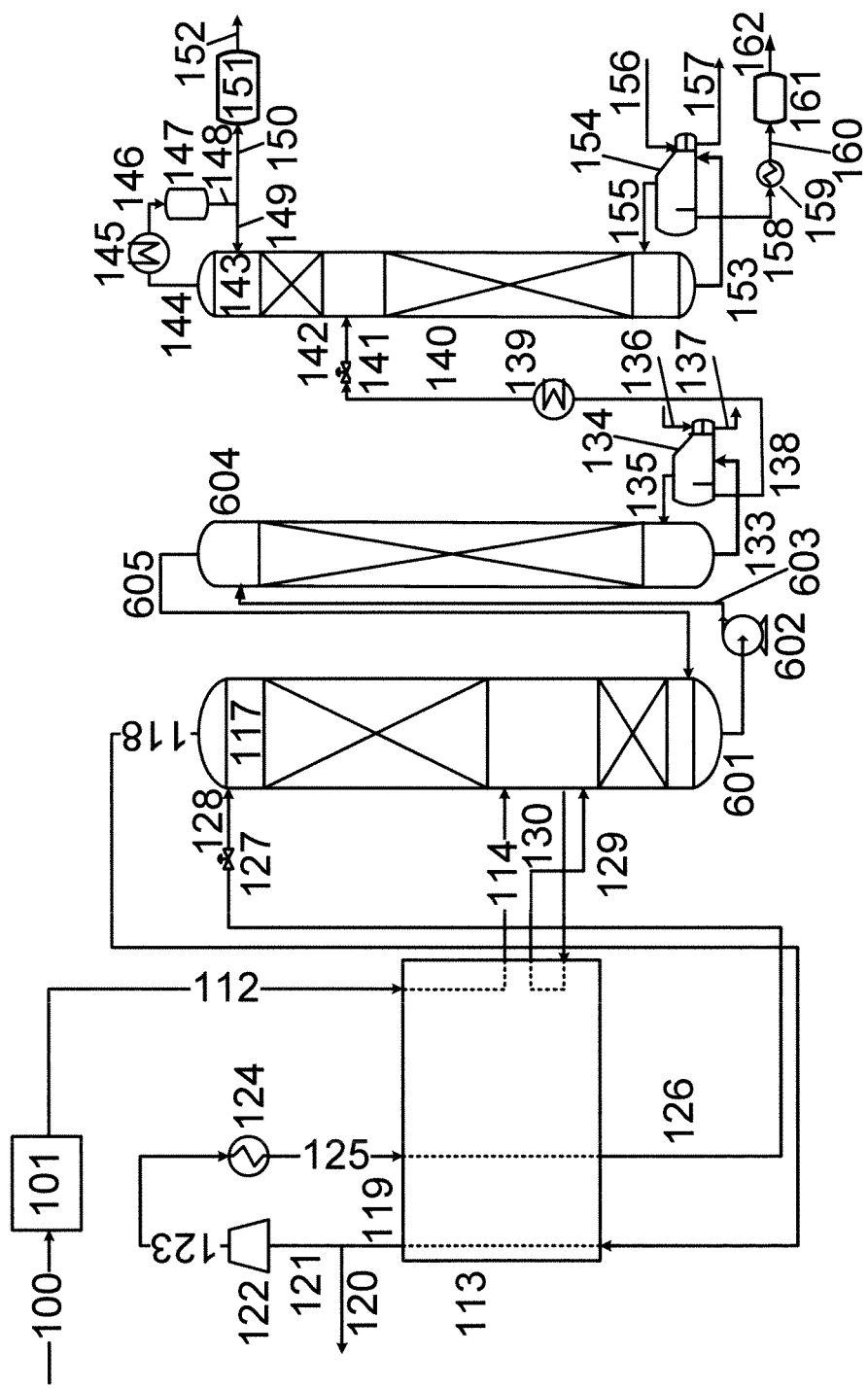
FIG. 6 is a flow sheet depicting a modified version of the embodiment depicted in FIG. 1 in which the distillation column system is a split column arranged side-by-side.

The process depicted in FIG. 6 is a modified version of the process depicted in FIG. 1 in which the distillation column system is a split column arranged side-by-side. The features of FIG. 6 which are common to FIG. 1 have been given the same reference numerals. The following is a discussion of the features of FIG. 6 that distinguish the process over that depicted in FIG. 1

In FIG. 6, the part of distillation column 117 below the feed is removed from column 117 and installed instead as a separate column 604. Liquid 601 from the bottom of column 117 is transferred by pump 602 to the top of column 604. Overhead vapor 605 from column 604 is returned to the bottom of column 117. In this way the overall height of the distillation column system may be reduced.

Aspects of the present invention include:

1. A process for recovering $C_{3+}$ hydrocarbon compounds from crude carbon dioxide fluid comprising $C_{1+}$ hydrocarbon compounds and at least one non-hydrocarbon "heavy" impurity, said process comprising:
feeding dry crude carbon dioxide fluid to a distillation column system for distillation to produce carbon dioxide-enriched overhead vapor comprising $C_1$-$C_3$ hydrocarbon compounds and said non-hydrocarbon "heavy" impurity, and $C_{3+}$ hydrocarbon-enriched bottoms liquid;
re-boiling said distillation column system by at least partially vaporizing by indirect heat exchange at least a portion of said $C_{3+}$ hydrocarbon-enriched bottoms liquid and at least one intermediate liquid in or taken from said distillation column system to provide vapor for said distillation column system;
cooling and at least partially condensing carbon dioxide-enriched overhead vapor and/or a compressed carbon dioxide-enriched recycle gas produced therefrom, by indirect heat exchange to produce at least partially condensed carbon dioxide-enriched gas; and
providing at least a portion of said at least partially condensed carbon dioxide-enriched gas as reflux for said distillation column system.

2. A process according to #1, wherein said crude carbon dioxide fluid is recovered from crude oil extracted using an enhanced oil recovery (EOR) process.

3. A process according to #1 or #2, wherein a portion of said carbon dioxide-enriched overhead vapor is used after suitable pressure and temperature adjustment to extract crude oil in an EOR process.

4. A process according to any of #1 to #3, wherein said non-hydrocarbon "heavy" impurity is hydrogen sulfide ($H_2S$).

5. A process according to any of #1 to #4. wherein said intermediate liquid, or at least one of said intermediate liquids, is at least partially vaporized by said indirect heat exchange against said carbon dioxide-enriched overhead vapor or said compressed carbon dioxide-enriched gas produced therefrom, thereby at least partially vaporizing said intermediate liquid.

6. A process according to any of #1 to #5, wherein said distillation column system operates at a pressure in the range from about 200 psia (1.3 MPa) to about 600 psia (4.2 MPa).

7. A process according to any of #1 to #6, wherein part of the duty required for cooling and at least partially condensing carbon dioxide-enriched overhead vapor and/or a compressed carbon dioxide-enriched gas produced therefrom is provided using an external refrigeration cycle.

8. A process according to #7, wherein the external refrigeration cycle uses propane as refrigerant.

9. A process according to any of #1 to #8 comprising at least one heat pump cycle using as working fluid a fluid from said distillation column system.

10. A process according to #9, wherein said working fluid is carbon dioxide-enriched overhead vapor.

11. A process according to #10, wherein the heat pump cycle comprises a recycle pressure from about 500 psia (3.4 MPa) to about 1000 psia (6.9 MPa).

12. A process according to any of #1 to #8 comprising at least one heat pump cycle, said heat pump cycle comprising:
warming said carbon dioxide-enriched overhead vapor by indirect heat exchange to produce warmed carbon dioxide-enriched gas;
compressing at least a portion of said warmed carbon dioxide-enriched gas to produce compressed carbon dioxide-enriched recycle gas at a first pressure;
using at least a portion of said compressed carbon dioxide-enriched recycle gas at said first pressure to provide reboiling duty required to at least partially vaporize said intermediate liquid(s) thereby cooling and at least partially condensing said compressed carbon dioxide-enriched recycle gas to produce condensed carbon dioxide-enriched recycle gas; and
expanding said condensed carbon dioxide-enriched recycle gas to produce said condensed carbon dioxide-enriched gas for use in providing said reflux to said distillation column system.

13. A process according to #12, wherein said compressed carbon dioxide-enriched recycle gas is aftercooled by indirect heat exchange prior to use in reboiling said distillation column system.

14. A process according to #12 or #13, wherein said crude carbon dioxide fluid is recovered from crude oil extracted using an EOR process and a part of said carbon dioxide-enriched gas is recycled to said EOR process after suitable pressure and temperature adjustment.

15. A process according to any of #12 to #14, wherein part of the duty required for cooling and at least partially condensing said compressed carbon dioxide-enriched recycle gas is provided using an external refrigeration cycle.

16. A process according to #15, wherein the external refrigeration cycle comprises a refrigerant that evaporates at or about the same temperature as the intermediate liquid evaporates when at least partially condensing said compressed carbon dioxide-enriched recycle gas.

17. A process according to #15 or #16, wherein the external refrigeration cycle uses propane as refrigerant.

18. A process according to any of #12 to #17, wherein said first pressure is in the range from about 1.3 times to 2.5 times the operating pressure of the distillation column system.

19. A process according to any of #12 to #18, wherein said first pressure is in the range from about 500 psia (3.4 MPa) to about 1000 psia (6.9 MPa).

20. A process according to any of #12 to #19, comprising:
  compressing a portion of warmed said carbon dioxide-enriched recycle gas to produce compressed carbon dioxide-enriched recycle gas at a second pressure that is greater than said first pressure;
  using said compressed carbon dioxide-enriched recycle gas at said second pressure to provide heating duty for the process, thereby cooling and at least partially condensing said compressed carbon dioxide-enriched recycle gas to produce supplemental condensed carbon dioxide-enriched recycle gas;
  expanding said supplemental condensed carbon dioxide-enriched recycle gas to produce expanded carbon dioxide-enriched condensate; and
  using said expanded carbon dioxide-enriched condensate to provide additional reflux to said distillation column system.

21. A process according to #20, wherein said second pressure is no more than about 2000 psia (14 MPa).

22. A process according to #9 or #10, wherein said working fluid is an intermediate liquid taken from said distillation column system.

23. A process according to any of #1 to #22 comprising:
  at least partially condensing at least a portion of said carbon dioxide-enriched overhead vapor by indirect heat exchange using an external refrigeration cycle to produce condensed carbon dioxide-enriched overhead vapor; and
  using at least a portion of said condensed carbon dioxide-enriched overhead vapor to provide reflux to said distillation column system.

24. A process according to #23, wherein the external refrigeration cycle uses propane as refrigerant.

25. A process according to any of #1 to #24, wherein $C_{3+}$ hydrocarbon-enriched bottoms liquid is removed from said distillation column system as product.

26. A process according to any of #1 to #25, wherein said $C_{3+}$ hydrocarbon-enriched bottoms liquid comprises carbonyl sulfide (COS), said process comprising removing at least a portion of said COS from said $C_{3+}$ hydrocarbon-enriched bottoms liquid.

27. A process according to any of #1 to #26, wherein said $C_{3+}$ hydrocarbon-enriched bottoms liquid comprises residual $H_2S$, said process comprising removing at least a portion of said residual $H_2S$ by adsorption.

28. A process according to #27, wherein said residual $H_2S$ is adsorbed on to a sacrificial adsorbent.

29. A process according to any of #1 to #28, wherein said $C_{3+}$ hydrocarbon-enriched bottoms liquid is separated into at least a "lighter" hydrocarbon fraction and a "heavier" hydrocarbon fraction.

30. A process according to #29 wherein said separation comprises:
  feeding said $C_{3+}$ hydrocarbon-enriched bottoms liquid to a stabilization column system for separation into at least a "lighter" hydrocarbon-enriched overhead vapor and a "heavier" hydrocarbon-enriched bottoms liquid;
  at least partially condensing a portion of said "lighter" hydrocarbon-enriched overhead vapor by indirect heat exchange to produce at least partially condensed "lighter" hydrocarbon-enriched overhead vapor;
  using a first portion of said at least partially condensed "lighter" hydrocarbon-enriched overhead vapor to provide reflux to said stabilization column system;
  removing a second portion of said at least partially condensed "lighter" hydrocarbon-enriched overhead vapor as said "lighter" hydrocarbon fraction;
  reboiling said stabilization column system by at least partially vaporizing at least a portion of said "heavier" hydrocarbon-enriched bottoms liquid in or taken from said stabilization column system by indirect heat exchange to produce vapor for said stabilization column system; and
  removing a portion of said "heavier" hydrocarbon-enriched bottoms liquid as said "heavier" hydrocarbon-enriched fraction.

31. A process according to #30, wherein said $C_{3+}$ hydrocarbon-enriched bottoms liquid is fed to said stabilization column system after suitable pressure reduction.

32. A process according to #30 or #31, wherein said stabilization column system operates at a pressure from about 50 psia (0.3 MPa) to about 300 psia (2 MPa).

33. A process according to any of #30 to #32, wherein said $C_{3+}$ hydrocarbon-enriched bottoms liquid is cooled by indirect heat exchange prior to being fed said stabilization column system.

34. A process according to any of #29 to #33, wherein said "lighter" hydrocarbon fraction comprises COS, said process comprising removing at least a portion of said COS from said "lighter" hydrocarbon fraction.

35. A process according to any of #29 to #34, wherein said crude carbon dioxide fluid is separated from crude oil extracted using an EOR process and wherein said $C_{3+}$ hydrocarbon-enriched bottoms liquid is separated by distillation using a pre-determined set of conditions to maximize the economic value of a blended crude oil and a Y-grade NGL, without exceeding contractual specifications regarding properties of the blended crude oil.

36. A process according to #35, wherein at least one of said properties of the blend oil is selected from the group consisting of API gravity and Reid vapor pressure.

37. A process according to any of #29 to #36, wherein at least a portion of said "heavier" hydrocarbon fraction is blended with crude oil to produce a blended oil.

38. A process according to any of #29 to #36, wherein said $C_{3+}$ hydrocarbon-enriched bottoms liquid is also separated into an intermediate hydrocarbon fraction.

39. A process according to #38, wherein at least a portion of said intermediate hydrocarbon fraction is blended with crude oil to produce a blended oil.

40. A process according to #39, wherein at least a portion of said "heavier" hydrocarbon fraction is blended with said "lighter" fraction to produce a Y-grade NGL.

41. A process according to any of #29 to #36, wherein a portion of said "heavier" hydrocarbon fraction is blended with said "lighter" hydrocarbon fraction to produce a Y-grade NGL.

42. A process according to any of #29 to #41, wherein a portion of said "heavier" hydrocarbon fraction is recycled to said distillation column system at a location above the location at which the dry crude carbon dioxide fluid is fed to said distillation column.

43. A process according to #42, wherein said portion of said "heavier" hydrocarbon fraction is cooled by indirect heat exchange prior to being fed to said distillation column system.

44. A process substantially as hereinbefore described with reference to the accompanying drawings.

EXAMPLE 1

By way of example of an advantage of the present invention, the calculated power consumption of the initial distillation process in column 117 of FIG. 1 is compared to the calculated power consumption of an equivalent process involving a propane refrigeration cycle. Both processes have been modelled using Aspen™ Plus software (version 7.2).

In the comparative propane refrigeration cycle, it has been assumed that the condensing duty of the distillation column 117 is provided by a propane refrigeration system. The feed is cooled against the carbon dioxide product stream 118 before it enters the distillation column 117. There are no side reboilers.

Using the same feed (as shown in Table 1) and the same specifications on the compositions of the carbon dioxide and NGL products (as shown in Table 2), we estimated the major differences in utility cost between the two cycles. The results are shown in Table 3. It should be noted that only the utility costs for the first distillation column 117 are considered because they are different in the two cycles. The utility cost for the feed pre-treatment and for the NGL stabilization column 143 have not been considered because they are the same in the two cycles.

The data presented in Table 3 indicate that the comparative propane refrigeration cycle requires about twice the power and more than three times the reboiler duty of the carbon dioxide heat pumped cycle of FIG. 1.

TABLE 3

|  | FIG. 1 | Comparative cycle |
|---|---|---|
| Reboiler duty (MMBTU/h) | 1.8 | 5.6 |
| Power (kw) |  |  |
| Refrigeration unit (kw) | n/a | 1548 |
| Compression (kw) | 853 | — |
| Aircooler (kw) | 19 | — |
| Total (kw) | 872 | 1548 |

While the invention has been described with reference to the preferred embodiments depicted in the figures, it will be appreciated that various modifications are possible within the spirit or scope of the invention.

In this specification, unless expressly otherwise indicated, the word 'or' is used in the sense of an operator that returns a true value when either or both of the stated conditions are met, as opposed to the operator 'exclusive or' which requires only that one of the conditions is met. The word 'comprising' is used in the sense of 'including' rather than to mean 'consisting of'. All prior teachings above are hereby incorporated herein by reference. No acknowledgement of any prior published document herein should be taken to be an admission or representation that the teaching thereof was common general knowledge in Australia or elsewhere at the date thereof.

EXAMPLE 2

Table 4 illustrates an example of a quantatitive comparison between different blending strategies based on product streams shown in Table 2. Assumptions on the price of different hydrocarbon components are made solely to represent their relative value. Strategy a, b, c in the table correspond to the blending strategy shown in FIG. 3 (*a*), (*b*), (*c*) respectively, as modelled using Aspen™ Plus (version 7.2). In this example, strategy (b) yields the highest economic value of the final products and both of the RVP and API gravity of the blended oil achieve their maximum values.

TABLE 4

| Price ($/barrel) | | | |
|---|---|---|---|
| NGL | | | |
| $C_3$ | 25 | | |
| $C_4$ | 40 | | |
| $C_{5+}$ | 70 | | |
| Blended oil | 85 | | |
| Blending constrains | | | |
| Reid Vapor Pressure (RVP) | ≤10 psi (69 kPa) | | |
| API gravity | ≤50° | | |
| Adjustable parameters | | | |
| boilup ratio | | | |
| reflux ratio | | | |
| Blending Strategy | | | |
|  | a | b | c |
| Maximized economic value MM ("million") $/year | 27.8 | 28.8 | 28.6 |
| Reid Vapor Pressure (RVP) | 4.8 psi (33 kPa) | 10.0 psi (69 kPa) | 10.0 psi (69 kPa) |
| API gravity | 50.0° | 50.0° | 50.0° |

The invention claimed is:

1. A process for recovering $C_{3+}$ hydrocarbon compounds from crude carbon dioxide fluid comprising at least 50 mol % carbon dioxide, $C_{1+}$ hydrocarbon compounds and hydrogen sulfide ($H_2S$) as an impurity, said process comprising:
    feeding said crude carbon dioxide fluid to a distillation column system for distillation to produce carbon dioxide-enriched overhead vapor comprising $C_1$-$C_3$ hydrocarbon compounds and at least substantially all of said $H_2S$ impurity, and $C_{3+}$ hydrocarbon-enriched bottoms liquid, wherein said $C_{3+}$ hydrocarbon-enriched bottoms liquid comprises at least 60% of the $C_3$ component in said crude carbon dioxide fluid fed to said column system;
    re-boiling said distillation column system by at least partially vaporizing by indirect heat exchange at least a portion of said $C_{3+}$ hydrocarbon-enriched bottoms liquid and at least one intermediate liquid in or taken from said distillation column system to provide vapor for said distillation column system;

cooling and at least partially condensing said carbon dioxide-enriched overhead vapor and/or a compressed carbon dioxide-enriched recycle gas produced from said carbon dioxide-enriched overhead vapor, by indirect heat exchange to produce at least partially condensed carbon dioxide-enriched gas; and providing at least a portion of said at least partially condensed carbon dioxide-enriched gas as reflux for said distillation column system.

2. The process of claim 1, wherein said crude carbon dioxide fluid is recovered from crude oil extracted using an enhanced oil recovery (EOR) process.

3. The process of claim 1, wherein a portion of said carbon dioxide-enriched overhead vapor is used after suitable pressure and temperature adjustment to extract crude oil in an EOR process.

4. The process of claim 1, wherein said intermediate liquid, or at least one of said intermediate liquids, is at least partially vaporized by said indirect heat exchange against said carbon dioxide-enriched overhead vapor or said compressed carbon dioxide-enriched gas produced from said carbon dioxide-enriched overhead vapor, thereby at least partially vaporizing said intermediate liquid.

5. The process of claim 1, wherein said distillation column system operates at a pressure in the range from about 200 psia (1.3 MPa) to about 600 psia (4.2 MPa).

6. The process of claim 1, wherein part of the duty required for cooling and at least partially condensing said carbon dioxide-enriched overhead vapor and/or the compressed carbon dioxide-enriched gas produced from said carbon dioxide-enriched overhead vapor is provided using an external refrigeration cycle.

7. The process of claim 6, wherein the external refrigeration cycle uses propane as refrigerant.

8. The process of claim 1 comprising at least one heat pump cycle using as working fluid a fluid from said distillation column system.

9. The process of claim 8, wherein said working fluid is said carbon dioxide-enriched overhead vapor.

10. The process of claim 9, wherein the heat pump cycle comprises a recycle pressure from about 500 psia (3.4 MPa) to about 1000 psia (6.9 MPa).

11. The process of claim 1 comprising at least one heat pump cycle, said heat pump cycle comprising:

warming said carbon dioxide-enriched overhead vapor by indirect heat exchange to produce warmed carbon dioxide-enriched gas;

compressing at least a portion of said warmed carbon dioxide-enriched gas to produce compressed carbon dioxide-enriched recycle gas at a first pressure;

using at least a portion of said compressed carbon dioxide-enriched recycle gas at said first pressure to provide reboiling duty required to at least partially vaporize said intermediate liquid(s) thereby cooling and at least partially condensing said compressed carbon dioxide-enriched recycle gas to produce condensed carbon dioxide-enriched recycle gas; and expanding said condensed carbon dioxide-enriched recycle gas to produce said condensed carbon dioxide-enriched gas for use in providing said reflux to said distillation column system.

12. The process of claim 11, wherein said compressed carbon dioxide-enriched recycle gas is aftercooled by indirect heat exchange prior to use in reboiling said distillation column system.

13. The process of claim 11, wherein said crude carbon dioxide fluid is recovered from crude oil extracted using an EOR process and a part of said carbon dioxide-enriched gas is recycled to said EOR process after suitable pressure and temperature adjustment.

14. The process of claim 11, wherein part of the duty required for cooling and at least partially condensing said compressed carbon dioxide-enriched recycle gas is provided using an external refrigeration cycle.

15. The process of claim 14, wherein the external refrigeration cycle comprises a refrigerant that evaporates at or about the same temperature as the intermediate liquid evaporates when at least partially condensing said compressed carbon dioxide-enriched recycle gas.

16. The process of claim 14, wherein the external refrigeration cycle uses propane as refrigerant.

17. The process of claim 11, wherein said first pressure is in the range from about 1.3 times to 2.5 times the operating pressure of the distillation column system.

18. The process of claim 11, wherein said first pressure is in the range from about 500 psia (3.4 MPa) to about 1000 psia (6.9 MPa).

19. The process of claim 11, comprising:

compressing a portion of warmed said carbon dioxide-enriched recycle gas to produce compressed carbon dioxide-enriched recycle gas at a second pressure that is greater than said first pressure;

using said compressed carbon dioxide-enriched recycle gas at said second pressure to provide heating duty for the process, thereby cooling and at least partially condensing said compressed carbon dioxide-enriched recycle gas to produce supplemental condensed carbon dioxide-enriched recycle gas;

expanding said supplemental condensed carbon dioxide-enriched recycle gas to produce expanded carbon dioxide-enriched condensate; and using said expanded carbon dioxide-enriched condensate to provide additional reflux to said distillation column system.

20. The process of claim 19, wherein said second pressure is no more than about 2000 psia (14 MPa).

21. The process of claim 8, wherein said working fluid is an intermediate liquid taken from said distillation column system.

22. The process of claim 1 comprising:

at least partially condensing at least a portion of said carbon dioxide-enriched overhead vapor by indirect heat exchange using an external refrigeration cycle to produce condensed carbon dioxide-enriched overhead vapor; and using at least a portion of said condensed carbon dioxide-enriched overhead vapor to provide reflux to said distillation column system.

23. The process of claim 22, wherein the external refrigeration cycle uses propane as refrigerant.

24. The process of claim 1, wherein said $C_{3+}$ hydrocarbon-enriched bottoms liquid is removed from said distillation column system as product.

25. The process of claim 1, wherein said $C_{3+}$ hydrocarbon-enriched bottoms liquid comprises carbonyl sulfide (COS), said process comprising removing at least a portion of said COS from said $C_{3+}$ hydrocarbon-enriched bottoms liquid.

26. The process of claim 1, wherein said $C_{3+}$ hydrocarbon-enriched bottoms liquid comprises residual $H_2S$, said process comprising removing at least a portion of said residual $H_2S$ by adsorption.

27. The process of claim 26, wherein said residual $H_2S$ is adsorbed on to a sacrificial adsorbent.

28. The process of claim 1, wherein said $C_{3+}$ hydrocarbon-enriched bottoms liquid is separated into at least a light hydrocarbon fraction and a heavy hydrocarbon fraction.

29. The process of claim 28 wherein said separation comprises:
feeding said $C_{3+}$ hydrocarbon-enriched bottoms liquid to a stabilization column system for separation into at least a light hydrocarbon-enriched overhead vapor and a heavy hydrocarbon-enriched bottoms liquid;
at least partially condensing a portion of said light hydrocarbon-enriched overhead vapor by indirect heat exchange to produce at least partially condensed light hydrocarbon-enriched overhead vapor;
using a first portion of said at least partially condensed light hydrocarbon-enriched overhead vapor to provide reflux to said stabilization column system;
removing a second portion of said at least partially condensed light hydrocarbon-enriched overhead vapor as said "lighter" hydrocarbon fraction;
reboiling said stabilization column system by at least partially vaporizing at least a portion of said heavy hydrocarbon-enriched bottoms liquid in or taken from said stabilization column system by indirect heat exchange to produce vapor for said stabilization column system; and
removing a portion of said heavy hydrocarbon-enriched bottoms liquid as said heavy hydrocarbon-enriched fraction.

30. The process of claim 29, wherein said $C_{3+}$ hydrocarbon-enriched bottoms liquid is fed to said stabilization column system after suitable pressure reduction.

31. The process of claim 29, wherein said stabilization column system operates at a pressure from about 50 psia (0.3 MPa) to about 300 psia (2 MPa).

32. The process of claim 29, wherein said $C_{3+}$ hydrocarbon-enriched bottoms liquid is cooled by indirect heat exchange prior to being fed to said stabilization column system.

33. The process of claim 28, wherein said light hydrocarbon fraction comprises COS, said process comprising removing at least a portion of said COS from said light hydrocarbon fraction.

34. The process of claim 28, wherein at least a portion of said heavy hydrocarbon fraction is blended with crude oil to produce a blended oil.

35. The process of claim 28, wherein said $C_{3+}$ hydrocarbon-enriched bottoms liquid is also separated into an intermediate hydrocarbon fraction.

36. The process of claim 35, wherein at least a portion of said intermediate hydrocarbon fraction is blended with crude oil to produce a blended oil.

37. The process of claim 36, wherein at least a portion of said heavy hydrocarbon fraction is blended with said light fraction to produce a Y-grade NGL.

38. The process of claim 28, wherein a portion of said heavy hydrocarbon fraction is blended with said light hydrocarbon fraction to produce a Y-grade NGL.

39. The process of claim 28, wherein a portion of said heavy hydrocarbon fraction is recycled to said distillation column system at a location above the location at which the dry crude carbon dioxide fluid is fed to said distillation column.

40. The process of claim 39, wherein said portion of said heavy hydrocarbon fraction is cooled by indirect heat exchange prior to being fed to said distillation column system.

* * * * *